(12) United States Patent
Park et al.

(10) Patent No.: US 11,244,679 B2
(45) Date of Patent: Feb. 8, 2022

(54) ELECTRONIC DEVICE, AND MESSAGE DATA OUTPUT METHOD OF ELECTRONIC DEVICE

(71) Applicant: Samsung Electronics Co., Ltd., Suwon-si (KR)

(72) Inventors: Nojoon Park, Seongnam-si (KR); Junhyung Park, Seoul (KR); Hyojung Lee, Goyang-si (KR); Taehee Lee, Seongnam-si (KR); Geonsoo Kim, Suwon-si (KR); Hanjib Kim, Suwon-si (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/482,908

(22) PCT Filed: Feb. 12, 2018

(86) PCT No.: PCT/KR2018/001840
§ 371 (c)(1),
(2) Date: Aug. 1, 2019

(87) PCT Pub. No.: WO2018/151486
PCT Pub. Date: Aug. 23, 2018

(65) Prior Publication Data
US 2020/0243080 A1 Jul. 30, 2020

(30) Foreign Application Priority Data
Feb. 15, 2017 (KR) .................. 10-2017-0020206

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/02* (2013.01); *G10L 15/26* (2013.01);
(Continued)

(58) Field of Classification Search
CPC ......... G10L 15/22; G10L 15/02; G10L 15/26; G10L 15/30; G10L 25/63; G06F 3/167; H04L 51/046
See application file for complete search history.

(56) References Cited

U.S. PATENT DOCUMENTS 6,785,649 B1 * 8/2004 Hoory .................... G10L 13/08
704/235
8,209,183 B1 * 6/2012 Patel ....................... G06K 9/72
704/270

(Continued)

FOREIGN PATENT DOCUMENTS

JP 2002-288101 A 10/2002
KR 10-2006-0054469 A 5/2006
(Continued)

*Primary Examiner* — Huyen X Vo
*Assistant Examiner* — Darioush Agahi
(74) *Attorney, Agent, or Firm* — Jefferson IP Law, LLP

(57) ABSTRACT

An electronic device according to various embodiments of the present invention comprises: a display; a communication circuit; a processor electrically connected with the display and the communication circuit; and a memory electrically connected with the processor, wherein when instructions, which can be included by the memory, are executed, the processor acquires message data received through a communication circuit and confirms attribute information included in the message data and, resulting from the confirmation, the display displays first text data for a first time if the text data included in the message data is first text data inputted from a touch screen of an external electronic device, and the display displays second text data for a (Continued)

second time different from the first time if the text data included in the message data is second text data converted from voice data.

17 Claims, 17 Drawing Sheets

(51) Int. Cl.
    *G10L 15/02*     (2006.01)
    *G10L 15/30*     (2013.01)
    *G10L 25/63*     (2013.01)
    *H04L 12/58*     (2006.01)
    *G10L 15/26*     (2006.01)

(52) U.S. Cl.
    CPC .............. *G10L 15/30* (2013.01); *G10L 25/63* (2013.01); *H04L 51/046* (2013.01); *G10L 2015/223* (2013.01)

(56) References Cited

U.S. PATENT DOCUMENTS

| | | | |
|---|---|---|---|
| 9,230,549 B1* | 1/2016 | Popik | G10L 13/00 |
| 2003/0055655 A1* | 3/2003 | Suominen | G06F 3/167 |
| | | | 704/276 |
| 2003/0120492 A1* | 6/2003 | Kim | G10L 13/00 |
| | | | 704/270 |
| 2007/0207785 A1 | 9/2007 | Chatterjee et al. | |
| 2011/0092190 A1 | 4/2011 | Vander Veen et al. | |
| 2011/0267316 A1* | 11/2011 | Kim | G06F 3/03542 |
| | | | 345/175 |
| 2014/0358536 A1* | 12/2014 | Choi | H04M 3/42051 |
| | | | 704/235 |
| 2015/0312175 A1 | 10/2015 | Langholz | |
| 2015/0317837 A1* | 11/2015 | Sholudko | G06F 3/0304 |
| | | | 345/633 |
| 2016/0035351 A1* | 2/2016 | Sendai | G10L 15/24 |
| | | | 704/275 |
| 2016/0277903 A1* | 9/2016 | Poosala | G06F 3/04842 |
| 2016/0352895 A1 | 12/2016 | Son et al. | |
| 2018/0314490 A1* | 11/2018 | Lee | G06F 3/167 |

FOREIGN PATENT DOCUMENTS

| | | |
|---|---|---|
| KR | 10-2006-0122092 A | 11/2006 |
| KR | 10-2014-0107736 A | 9/2014 |
| KR | 10-2015-0047150 A | 5/2015 |
| KR | 10-2016-0113309 A | 9/2016 |
| KR | 10-2016-0141595 A | 12/2016 |

* cited by examiner

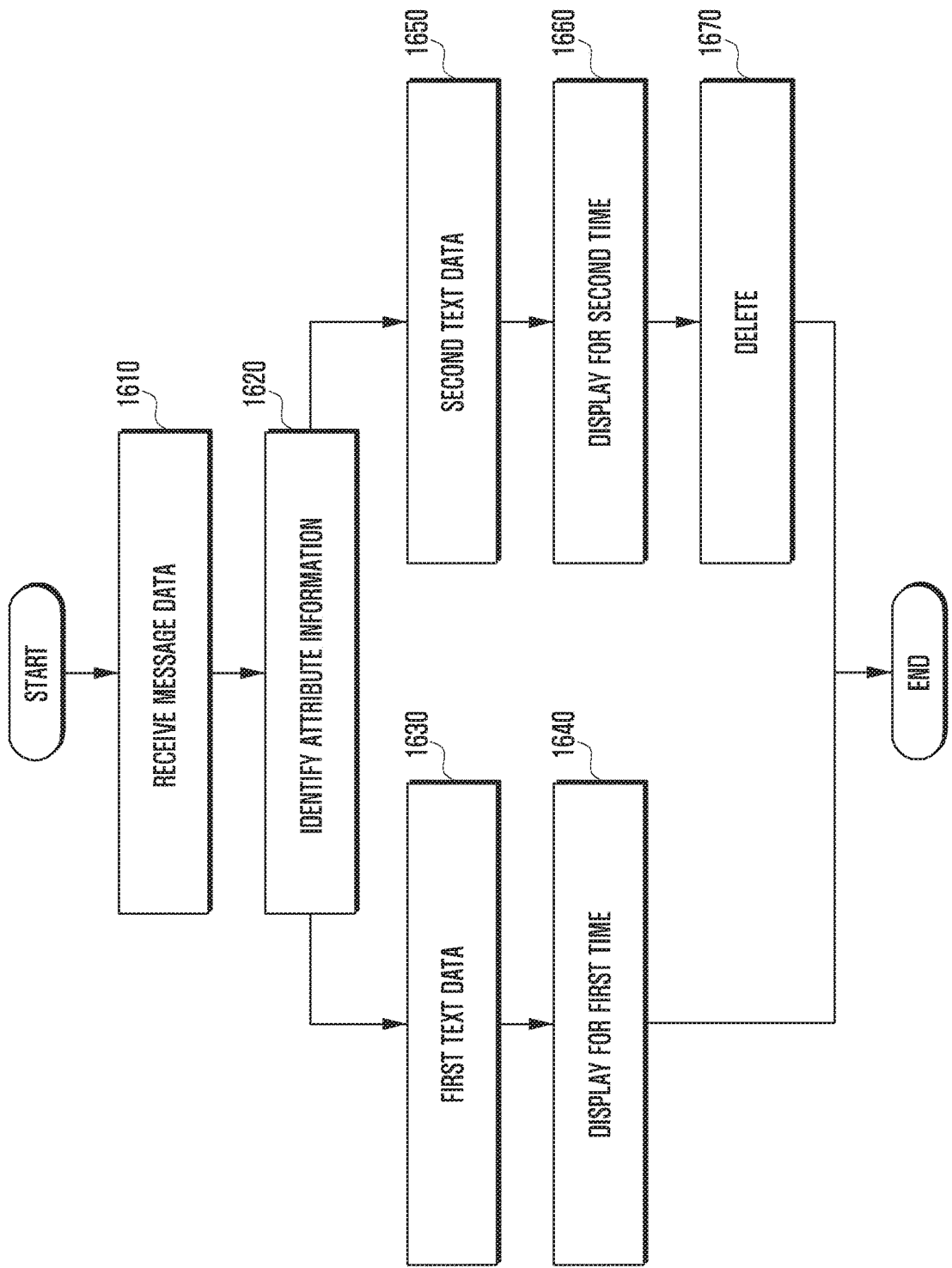

ELECTRONIC DEVICE, AND MESSAGE DATA OUTPUT METHOD OF ELECTRONIC DEVICE

TECHNICAL FIELD

The disclosure relates to an electronic device and, more particularly, to a method of outputting text-based message data by an electronic device.

BACKGROUND ART

With the development of mobile communication technology and processor technology, portable terminal devices (hereinafter, referred to as electronic devices) can execute various applications in addition to the conventional call function. Among them, text-based message applications are the most widely used technologies in mobile communication-based electronic devices.

Speech recognition technology recognizes a user's voice and converts the recognized user's voice into text. As such speech recognition technology has been developed and the demand for more convenient and easier use of electronic devices has increased, there are an increasing number of scenarios in which electronic devices are controlled by voice and commands are issued.

One of the scenarios in which the speech recognition technology is utilized is speech to text (STT) that performs an input of a text message to be transmitted to the other party through a message application on the basis of speech recognition. That is, a user can transmit the text message to the other party through a speech recognition function that is easy to use when typing is difficult by hand, such as while driving or working.

DETAILED DESCRIPTION OF THE INVENTION

Technical Problem

The user of a receiving electronic device, which is the other party of the message application, sees the same type of text message, regardless of whether the method used to provide the text message was through using a keyboard or speech recognition in an originating electronic device.

If a message is input by voice and transmitted, the message can be perceived as content different from the content actually uttered by the user due to factors such as surrounding noise, limitations of the performance of a speech recognition engine, and the like. Also, if a message is input by voice on an electronic device having no display, there is a problem in that a text message is immediately transmitted to a counterpart electronic device without the user's confirmation of the content recognized by the electronic device. These problems may be reasons that a user does not actively use speech recognition technology when inputting a text message.

Therefore, the disclosure has been made in view of the above-mentioned problems, and an aspect of the disclosure is to output a message on a display of an electronic device on the basis of a method in which the message is input by an originating electronic device.

Solution to Problem

An electronic device according to various embodiments of the disclosure may include: a display configured to include a touch screen; a voice input device configured to collect a voice to generate voice data; a communication circuit; a processor configured to be electrically connected to the display, the voice input device, and the communication circuit; and a memory configured to be electrically connected to the processor, wherein the memory includes, when executed, instructions that cause the processor to receive first text data input through the touch screen and/or the voice data input through the voice input device and to generate message data including the first text data and/or second text data converted from the voice data and attribute information related to a type of an input method of the first text data and/or the second text data, and that cause the communication circuit to transmit the message data to an external electronic device.

An electronic device according to various embodiments of the disclosure may include: a display; a communication circuit; a processor configured to be electrically connected to the display and the communication circuit; and a memory configured to be electrically connected to the processor, wherein the memory includes, when executed, instructions that cause the processor to acquire message data received through the communication circuit and to identify attribute information included in the message data, and that cause the display to display, when text data included in the message data is first text data input from a touch screen of an external electronic device on the basis of the identification result, the first text data for a first time and to display, when the text data included in the message data is second text data converted from voice data, the second text data for a second time different from the first time.

A message data output method of an electronic device according to various embodiments of the disclosure may include: receiving message data generated by an external electronic device; identifying attribute information included in the message data; displaying, when text data included in the message data is first text data input from a touch screen of the external electronic device on the basis of the identification result, the first text data for a first time; and displaying, when the text data included in the message data is second text data converted from voice data, the second text data for a second time different from the first time.

Advantageous Effects of Invention

According to various embodiments of the disclosure, an originating electronic device may distinguish the type of a message according to the type of an input method and may transmit the message, and a receiving electronic device may differentiate the output of the message on the basis of the type of input method, whereby there is an effect that the use of a text message based on speech recognition can be activated.

BRIEF DESCRIPTION OF DRAWINGS

FIG. 16 is a flowchart illustrating a message output method of a receiving electronic device according to various embodiments.

MODE FOR CARRYING OUT THE INVENTION

Figure 1:
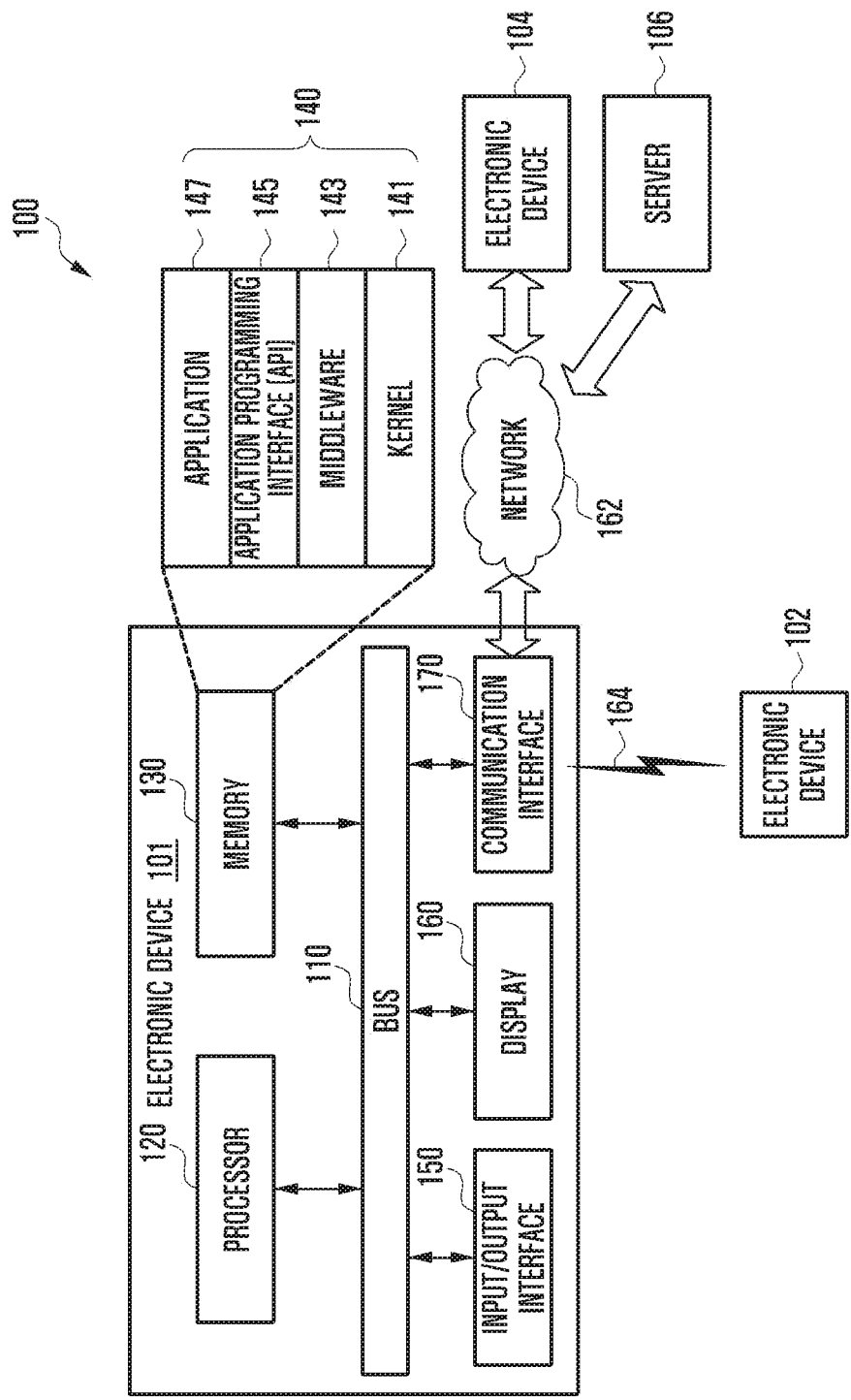
FIG. 1 illustrates an electronic device in a network environment in various embodiments.

Various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the disclosure, the expression "A or B" or "at least one of A and/or B" is intended to include any possible combination of enumerated items. In the disclosure, expressions such as "1st" or "first," "2nd" or "second", etc. may modify various components regardless of the order and/or the importance but do not limit corresponding components. When it is mentioned that a (first) component is "connected" to or "accessed" by another (second) component, it may be understood that the component is directly connected to or accessed by the other component or that still other (third) component is interposed between the two components.

In the disclosure, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

According to various embodiments of the disclosure, an electronic device may include at least one of a smart phone, a tablet Personal Computer (PC), a mobile phone, a video phone, an e-book reader, a desktop PC, a laptop PC, a netbook computer, a workstation, a server, a Personal Digital Assistant (PDA), a portable Multimedia Player (PMP), an MP3 player, a medical device, a camera, and a wearable device. The wearable device may include at least one of an appcessory type device (e.g. a watch, a ring, a bracelet, an anklet, a necklace, glasses, contact lens, and Head-Mounted-Device (HMD), a textile or clothes-integrated device (e.g., electronic clothes), a body-attached device (e.g., skin pad and tattoo), and a bio-implemented circuit. According to various embodiments, the electronic device may include at least one of television (TV), a Digital Video Disk (DVD) player, an audio player, an air conditioner, a cleaner, an oven, a microwave oven, a washing machine, an air cleaner, a set-top box, a home automation control panel, a security control panel, a media box (for example, Samsung Home-Sync™, Apple TV™, or Google TV™), game consoles (for example, Xbox™, PlayStation™), an electronic dictionary, an electronic key, a camcorder, and an electronic frame.

According to an alternative embodiment, the electronic device may include at least one of a medical device (such as portable medical measuring devices (including a glucometer, a heart rate monitor, a blood pressure monitor, and a body temperature thermometer), a Magnetic Resonance Angiography (MRA) device, a Magnetic Resonance Imaging (MRI) device, a Computed Tomography (CT) device, a camcorder, and a microwave scanner), a navigation device, a Global Navigation Satellite System (GNSS), an Event Data Recorder (EDR), a Flight Data Recorder (FDR), an automotive infotainment device, marine electronic equipment (such as marine navigation system and gyro compass), aviation electronics (avionics), security equipment, an automotive head unit, an industrial or household robot, a drone, an Automatic Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler). According to an embodiment of the disclosure, the electronic device may include at least one of furniture, a part of a building/structure, a part of a vehicle, an electronic board, an electronic signature receiving device, a projector, and a sensor (such as water, electricity, gas, and electric wave meters). According to various embodiments of the disclosure, the electronic device may be flexible or a combination of at least two of the aforementioned devices. According to an embodiment of the disclosure, the electronic device is not limited to the aforementioned devices. In the disclosure, the term "user" may denote a person who uses the electronic device or a device (e.g., artificial intelligent electronic device) which uses the electronic device.

A description is made of the electronic device 101 in a network environment 100 with reference to FIG. 1. The electronic device 101 may include a bus 110, a processor 120, a memory 130, an input/output interface 150, a display 160, and a communication interface 170. In an embodiment, the electronic device 101 may be configured without at least one of the aforementioned components or with another component. The bus 110 may include a circuit for interconnecting components 110 to 170 such that the components communicate signal (e.g., control message and data). The processor 120 may include at least one of a central processing device, an application processor, and a communication processor (CP). The processor 120 may execute operation related to the control of and/or communication among the other components constituting the electronic device 101 and perform data processing.

The memory 130 may include a volatile and/or non-volatile memory. The memory 130 may store a command or data associated with at least one of the components of the electronic device 101. According to an embodiment, the memory 130 may store software and/or programs 140. The programs 140 may include a kernel 141, a middleware 143, an application programing interface (API) 145, and/or an application program (or "application") 147. At least part of the kernel 141, middleware, and API 145 may be referred to as operating system. The kernel 141 may control or manage system resources (e.g., bus 110, processor 120, and memory 130) for use in executing operations or functions implemented in other programming modules (e.g., middleware 143, API 145, and application program 147). Further, the kernel 141 can provide an interface through which the middleware 143, the API 145, and/or the application 147 can access an individual element of the electronic apparatus 101 and then control and/or manage system resources.

The middleware 143 may relay the data communicated between the API 145 or the application program 147 and the kernel 141. The middleware 143 may process at least one task request received from the application program 147 according to priority. For example, the middleware 143 may assign a priority to at least one of the application programs 147 for use of the system resources (e.g., the bus 110, the processor 120, and the memory 130) of the electronic device 101 and process the at least one task request according to the assigned priority. The API 145 may include an interface for controlling the functions provided by the kernel 141 and the middle 143 and includes at least one interface or function (e.g., command) for file control, window control, and video control, and text control, by way of example. The input/output interface 150 may relay a command or data input by a user or via an external electronic device to other component(s) of the electronic device 101 and output a command or data received from other component(s) of the electronic device 101 to the user or the external electronic device.

Examples of the display 160 may include a liquid crystal display (LCD), a light emitting diodes display (LED), a organic LED (OLED) display, a microelectromechanical systems (MEMS) display, and an electronic paper display. The display 160 may display various contents (e.g., text, image, video, icon, and symbol) to the user by way of example. The display 160 may include a touchscreen that is capable of receiving a touch, gesture, proximity, or hovering input made with an electronic pen or part of the user's body by way of example. The communication interface 170 may set up a communication channel between the electronic device 101 and an external device (e.g., first external electronic device 102, second external electronic device 104, and server 106). For example, the communication interface 170 may connect to the network 162 through a wireless or wireline communication channel to communicate with the external electronic device (e.g., second external electronic device 104 and server 106).

Examples of the wireless communication may include cellular communications using at least one of LTE, LTE Advanced (LTE-A), code division multiple access (CDMA), wideband CDMA (WCDMA), universal mobile telecommunications system (UMTS), Wireless Broadband (WiBro), and global system for mobile communications (GSM). According to an embodiment, examples of the wireless communication may include communications using at least one of wireless fidelity (Wi-Fi), Bluetooth, Bluetooth low energy (BLE), Zigbee, near field communication (NFC), magnetic secure transmission, radio frequency (RF), and body area network (BAN). According to an embodiment, examples of the wireless communication may include GNSS communication. Examples of the GNSS may include a global positioning system (GPS), a global navigation satellite system (Glonass), a Beidou navigation satellite system (hereinafter, referred to as "Beidou"), and Galileo (the European global satellite-based navigation system). In the following description, the terms "GPS" and "GNSS" are interchangeably used. Examples of the wireline communication may include communications using at least one of universal serial bus (USB), high definition multimedia interface (HDMI), recommended standard 233 (RS-232), power line communication, and plain old telephone service (POTS). The network 162 may be a telecommunication network including a computer network (e.g., LAN and WAN), Internet, and telephony network, by way of example.

Each of the first and second external electronic device 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with execution result in itself or after performing additional processing thereon. In order to accomplish this, it may be possible to use a cloud computing, a distributed computing, or a client-server computing technology.

Figure 2:
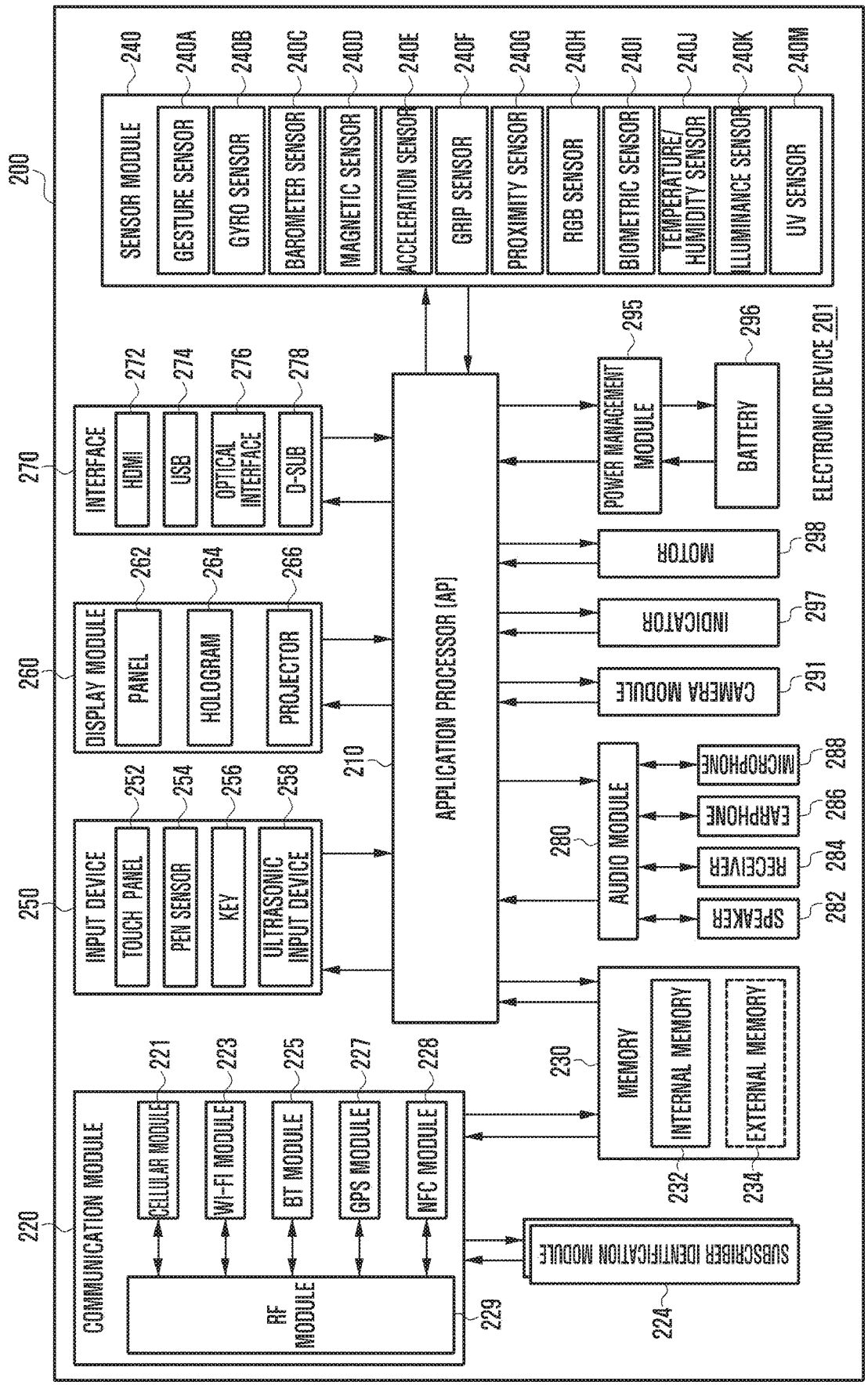
FIG. 2 is a block diagram illustrating an electronic device according to various embodiments.

FIG. 2 is a block diagram illustrating an electronic device 201 according to various embodiments. The electronic device 201 may include all or part of the electronic device 101 depicted in FIG. 1. The electronic device 201 may include at least one processor (e.g., AP 210), a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298. The processor 210 may execute the operation system or an application program to control a plurality of hardware or software components connected to the processor 210 and perform various data processing and operations. The processor 210 may be implemented in the form of system on chip (SoC) by way of example. According to an embodiment, the processor 210 may also include a graphic processing unit (GPU) and/or an image signal processor. The processor 210 may include at least part (e.g., cellular module 221) of the components depicted in FIG. 2). The processor 210 may load the command or data received from at lease one of other components (e.g., non-volatile memory) onto the volatile memory and store processed result data in the non-volatile memory.

The communication module 220 may have a configuration identical with or similar to that of the communication interface 170 by way of example. For example, the communication module 220 may include a cellular module 221, a Wi-Fi module 223, a Bluetooth module 225, a GNSS module 227, an NFC module 228, and an RF module 229. The cellular module 221 may provide a voice call service, a video call service, a text messaging service, and an Internet access service via a communication network, by way of example. According to an embodiment, the cellular module 221 may identity and authenticate the electronic device 201 and perform identification and authentication on the electronic device 201 in the communication network by means of the subscriber identity module (SIM) 224. According to an embodiment, the cellular module 221 may perform part of the functions of the processor 210. According to an embodiment, the cellular 221 may include a communication processor (CP). According to an embodiment, part of the cellular module 221, the Wi-Fi module 223, the Bluetooth module 225, the GNSS module 227, and the NFC module 228 (e.g., two or more) may be included in an integrated chip (IC) or an IC package. The RF module 229 may transmit/receive a communication signal (e.g., RF signal). The RF module 229 may include a transceiver, a power amplification module (PAM), a frequency filter, a low noise amplifier (LNA), and an antenna by way of example. According to an alternative embodiment, at least one of the cellular module 221, the Wi-Fi module 223, the Bluetooth module 225, the GNSS module 227, and the NFC module 228 may transmit/receive an RF signal via a separate RF module. The SIM 224 may include a card containing a subscriber identity module or an embedded SIM and contain unique identity information (e.g., integrated circuit card identifier (ICCID)) or subscriber information (e.g., international mobile subscriber identity (IMSI)).

The memory 230 (e.g., memory 130) may include an internal memory 232 and an external memory 234 by way of example. The internal memory 232 may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, and flash memory, a hard drive, and a solid state drive (SSD) by way of example. The external memory 234 may include flash drive such as compact flash (CF), secure digital (SD), Micro-SD, Mini-SD. extreme digital (xD), multimedia card (MMC), and memory stick. The external electronic device 234 may be functionally or physically connected with the electronic device 201 via various interfaces.

The sensor module 240 may measure physical quantities or detects an operation state of the electronic device 201 and convert the measured or detected information to an electrical signal. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment, the electronic device 201 may further include another processor configured to control the sensor module 240 as part of or separated from the processor 210, and the another processor may control the sensor module 240 while the processor 210 is in a sleep state.

The input device 250 may include a touch panel 252, a (digital) pen sensor 254, a key 256, or an ultrasonic input device 258 by way of example. The touch panel 252 may use at least one of capacitive, resistive, infrared, or ultrasonic methods by way of example. The touch panel 252 may further include a control circuit. The touch panel 252 may further include a tactile layer to provide tactile response to a user. The (digital) pen sensor 254 may include a sheet for recognition as part of a touch panel or a separate sheet for recognition. The key 256 may include a physical button, an optical key, or a keypad, by way of example. The ultrasonic input device 258 may detect ultrasonic waves generated by an input tool through a microphone (e.g., the microphone 288) and ascertain data corresponding to the detected ultrasonic waves.

The display 260 (e.g., the display 160) may include a panel 262, a hologram device 264, a projector 266, and a control circuit for controlling the aforementioned components. The panel 262 may be implemented to be flexible, transparent, or wearable. The panel 262 may include a touch panel 252 and at least one module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in the air using a light interference phenomenon. The projector 266 may display an image by projecting light on a screen. The screen may be placed inside or outside the electronic device 201 by way of example. The interface 270 may include an HDMI 272, a USB 274, an optical interface 276, or a D-subminiature (D-sub) 278 by way of example. The interface 270 may be included in the communication interface 170 shown in FIG. 1 by way of example. Additionally or alternatively, the interface 270 may include a mobile high-definition link (MHL) interface, an SD card/MMC interface, or an infrared data association (IrDA) standard interface.

The audio module 280 may convert sounds into electrical signals and convert electrical signals into sounds. At least some components of the audio module 280 may be included in the input/output interface 145 shown in FIG. 1 by way of example. The audio module 280 may process sound information inputted/outputted through a speaker 282, a receiver 284, an earphone 286, or a microphone 288. The camera module 291, as a device for capturing a still image and a video image, may include at least one image sensor (e.g., a front sensor or a rear sensor), a lens, an image signal processor (ISP), or a flash (e.g., an LED or a xenon lamp). The power management module 295 may manage the power of the electronic device 201. The power management module 295 may include a power management IC (PMIC), a charger IC, or a battery or fuel gauge. The PMIC may support a wireline and/or wireless charging methods. Examples of the wireless charging method may include a magnetic resonance method, a magnetic induction method, and an electromagnetic method, and the PMIC may further include supplementary circuit such as a coil loop, a resonant circuit, and a rectifier. The battery gauge may measure a remaining capacity of the battery 296, charging voltage and current, and temperature of the battery by way of example. The battery 296 may include a rechargeable battery and/or a solar battery by way of example.

The indicator 297 may display a specific state of the electronic device 201 or part thereof (e.g., the processor 210), such as a booting state, a message state, or a charging state. The motor 298 may convert electrical signals into mechanical vibration and may generate vibration or haptic effect. The electronic device 201 may include a mobile TV-support device (e.g., a GPU) for processing media data generated in compliance with the standards such as digital multimedia broadcasting (DMB), digital video broadcasting (DVB), and mediaFLO™. Each of the above-mentioned components may be configured with at least one component and the name of a corresponding component may vary according to the type of an electronic device. According to various embodiments, the electronic device (e.g., electronic device 201) may be configured without part of the aforementioned components or with additional components; part of the components may be combined into one entity capable of executing the same functions of the components before being combined.

Figure 3:
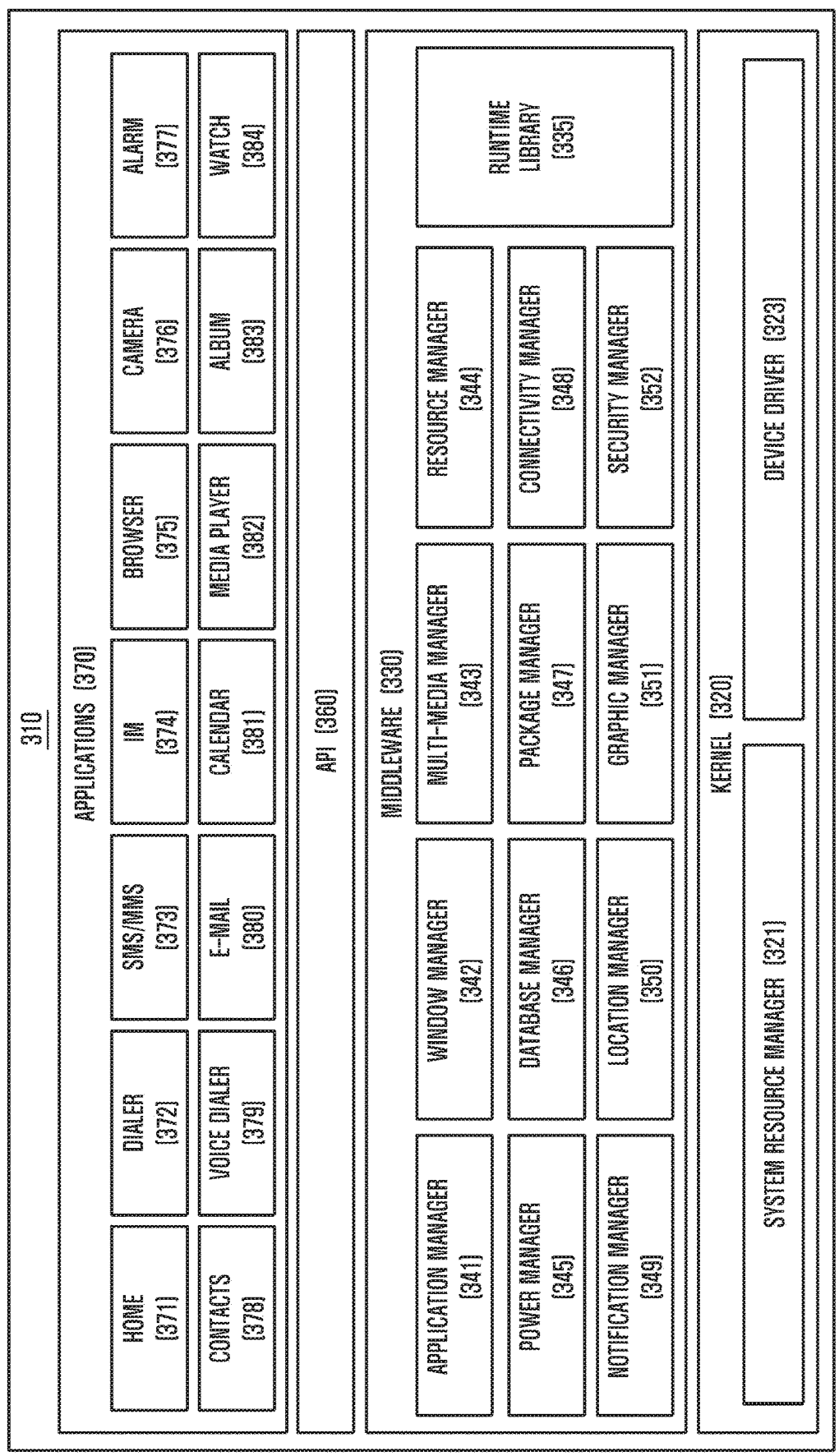
FIG. 3 is a block diagram illustrating a program module according to various embodiments.

FIG. 3 is a block diagram illustrating a program module according various embodiments. According to an embodiment, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ for example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 320 may include a system resource manager 321 a device driver 323 by way of example. The system resource manager 321 may control, assign, or withdraw the system resources. According to an embodiment of the disclosure, the system resource manager 321 may include a process manager, a memory manager, and a pile system manager. The device driver 323 may include a display driver, a camera driver, a Bluetooth driver, a common memory driver, a USB driver, a keypad driver, a Wi-Fi driver, an audio driver, and an inter-process communication (IPC) driver. The middleware 330 may provide a function for use by the applications in common and various functions for allowing the applications 370 to use the restricted system resources of the electronic device efficiently through the API 360. According to various embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352.

The runtime library 335 may include a library module for use by a compiler to add new functions with a programming language while the applications 370 are in running. The runtime library 335 may perform input/output management, memory management, and arithmetic function processing. The application manager 341 may manage the life cycles of the applications 370 by way of example. The window manager 342 may manage the GUI resources in use for screens. The multimedia manager 343 may check the formats of media files to encode or decode the media files using the codecs proper to the corresponding formats. The resource manager 344 may manage source codes of the applications 370 and memory space. The power manager 345 may mange battery capacity and power by way of example and provide power information necessary for the operation of the electronic device. According to an embodiment, the power manager 345 may interoperate with a basic input/output system (BIOS). The database manager 346 may generate, search, and modify a data based for use by the applications 370 by way of example. The package manager 347 may manage installation and update of application distributed in the form of a package file.

The connectivity manager 348 may manage a wireless connection by way of example. The notification manager 349 may provide the user with events such as incoming message alarm, appointment alarm, and proximity alarm by way of example. The location manager 350 may manage location information of the electronic device. The graphic manager 351 may manage graphical effects and user interfaces to be provided to user by way of example. The security manager 352 may responsible for system security and user authentication by way of example. According to an embodiment, the middleware 330 may include a telephony manager for managing voice and video call functions of the electronic device and a middleware module capable of combining the functions of the aforementioned components. According to an embodiment, the middleware 330 may provide operation system type-specific modules. The middleware 330 may delete part of the existing components or add new components dynamically. The API 360 may provide operating system type-specific API program functions sets by way of example. For example, it may be possible to a set of APIs per platform for the case of the android or iOS and two or more sets of APIs per platform for the case of the Tizen.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., workout amount and blood sugar), environmental information provision application (e.g., atmospheric pressure, humidity, and temperature). According to an embodiment, the application 370 may include an information exchange application for supporting information exchange between the electronic device and an external electronic device. The information exchange application may include a notification relay application for relaying specific information to the external electronic device and a device management application for managing the external electronic device by way of example. The notification relay application may relay notification information generated by another application of the electronic device to the external electronic device or provide the user with the notification information received from the external electronic device. The device management application may manage the functions of the external electronic device (e.g., turn-on/off of the external electronic device in itself (or a component thereof) and brightness (or resolution) adjustment of the display) communicating with the electronic device and install, uninstall, or update the applications operating on the external electronic device by way of example. According to an embodiment, the application 370 may include an application (e.g., healthcare application of a mobile medical device) designated according to the property of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
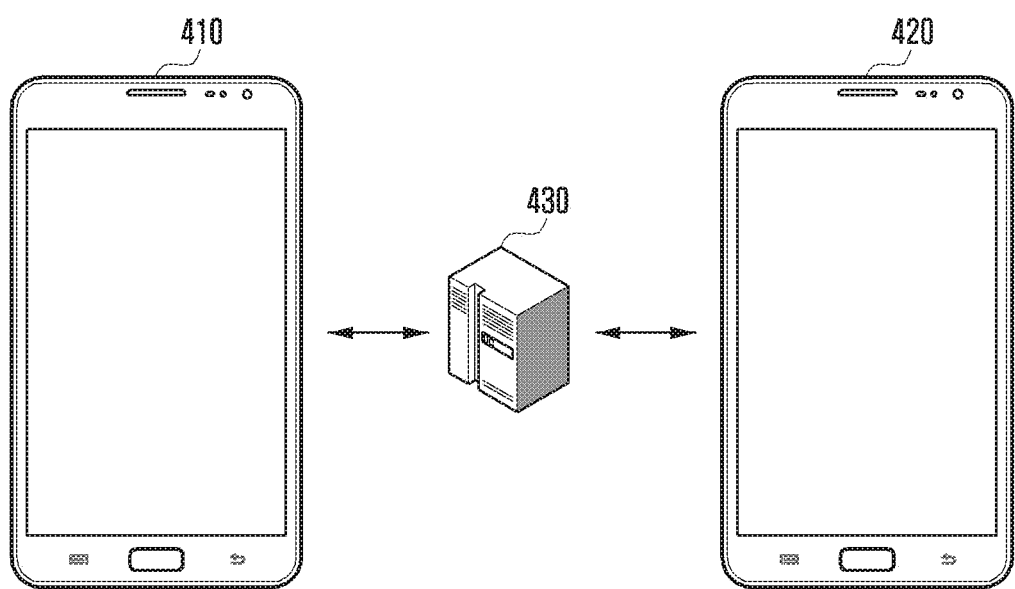
FIG. 4 schematically illustrates an electronic device and a service server device according to various embodiments.

FIG. 4 schematically illustrates an electronic device and a message service server according to various embodiments.

According to various embodiments, an electronic device may be implemented in a known portable electronic device such as a smart phone, a tablet PC, and the like. Throughout this specification, an electronic device that generates and transmits message data is referred to herein as a first electronic device 410 (or an originating electronic device), and an electronic device that receives and displays the message data is referred to as a second electronic device 420 (or a receiving electronic device). Also, in the following description, an external electronic device referred to in the description of the first electronic device 410 refers to the second electronic device 420, and an external electronic device referred to in the description of the second electronic device 420 refers to the first electronic device 410.

The first electronic device 410 may be the electronic device 101 of FIG. 1. The second electronic device 420 may be the external electronic device 102 or 104 of FIG. 1. A service server device 430 may be the server 106 of FIG. 1. The first electronic device 410 and the second electronic device 420 may be of the same type or different types. Also, message applications installed on the first electronic device 410 and the second electronic device 420 may be of the same type or different types.

The detailed hardware/software configurations of the first electronic device 410 and the second electronic device 420 will be described in more detail with reference to FIG. 6 (a first electronic device 600) and FIG. 10 (a second electronic device 1000).

According to various embodiments, the first electronic device 410 and the second electronic device 420 may send/receive message data using wired/wireless communication. The message data transmitted from the first electronic device 410 may be transmitted to the service server device 430, and may be transmitted from the service server device 430 to the second electronic device 420. According to another embodiment, the first electronic device 410 and the second electronic device 420 may transmit the message data in a peer to peer (P2P) scheme by wired/wireless communication, and in this case, the service server device 430 may be omitted.

The service server device 430 may be a server device that provides message services such as short message service (SMS), instant message, e-mail, social network service, and the like.

Text message generated and transmitted by the first electronic device 410 may be text data input by a user of the first electronic device 410 using a keyboard displayed on a touch screen, or may be text data obtained by converting voice data of the user of the first electronic device 410 using a speech recognition engine. Hereinafter, the former will be referred to as first text data and the latter will be referred to as second text data.

The first electronic device 410 may receive first text data and/or voice data input through a voice input device, may generate message data including second text data converted from the first text data and/or the voice data and attribute information related to the type of an input method of the first text data and/or the second text data, and may transmit the generated message data to the second electronic device 420 (or the service server device 430).

The second electronic device 420 may receive the message data from the first electronic device 410 (or the service server device 430, and may identify the attribute information included in the message data. Next, when the text data included in the message data is first text data input from a touch screen of an external electronic device on the basis of the identification result, the second electronic device 420 may display the first text data for a first time, and when the text data included in the message data is second text data converted from the voice data, the second electronic device 420 may display the second text data for a second time different from the first time.

Figure 5:
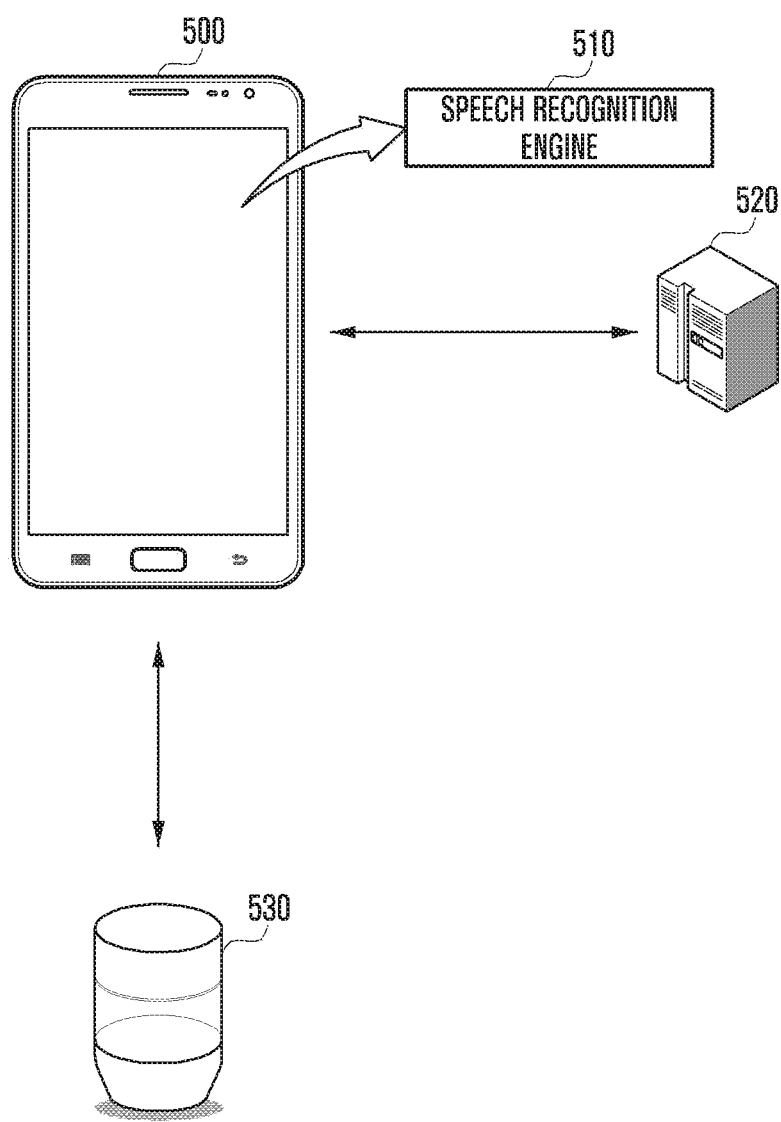
FIG. 5 illustrates a speech recognition engine of an electronic device according to various embodiments.

FIG. 5 illustrates a speech recognition engine of an electronic device according to various embodiments.

There is no limitation in a method in which an electronic device 500 (e.g., the first electronic device 410 of FIG. 4) acquires second text data converted from user's voice data. FIG. 5 illustrates three examples of the method of acquiring the second text data.

According to an embodiment, the electronic device 500 may include a speech recognition engine 510. The speech recognition engine 510 may be a software module, and may be operated by a processor (e.g., the application processor 210 of FIG. 2) or may be provided as separate hardware.

According to another embodiment, the electronic device 500 may transmit voice data input from a user to an external speech recognition server 520 through a network (e.g., the network 1652 of FIG. 1), and the speech recognition server 520 may acquire second text data from the voice data and may provide the acquired second text data to the electronic device 500.

According to another embodiment, user's voice data may be acquired on a hub device 530 connected wiredly or wirelessly connected to the electronic device 500, and second text data may be acquired from the voice data and transmitted to the electronic device 500. According to another embodiment, the hub device 530 may acquire user's voice data to provide the acquired voice data to the electronic device 500, and the speech recognition engine 510 of the electronic device 500 may acquire second text data from the voice data received from the hub device 530. According to another embodiment, the hub device 530 may provide acquired user's voice data and an address (e.g., IP address) of the electronic device 500 to the speech recognition server 520, and the speech recognition server 520 may acquire second text data from the voice data to provide the acquired second text data to the electronic device 500. In the above embodiments, the hub device 530 may also provide the acquired user's voice data to the electronic device 500.

The electronic device 500 may acquire the second text data from the voice data using at least one of the methods described in the above embodiments. For example, the electronic device 500 may acquire the second text data using the speech recognition engine 510 provided in the electronic device 500 when the input user's voice data is relatively short. When an amount of the input user's voice data is large, since a larger amount of processing is required, the electronic device 500 may transmit the voice data to the speech recognition server 520 and may receive the second text data from the speech recognition server 520.

The speech recognition engine 510, the speech recognition server 520, and the hub device 530 may subjected to processes, for example, feature extraction, pattern matching, and language processing to acquire the text data from the voice data, and a detailed description thereof will be omitted.

Figure 6:
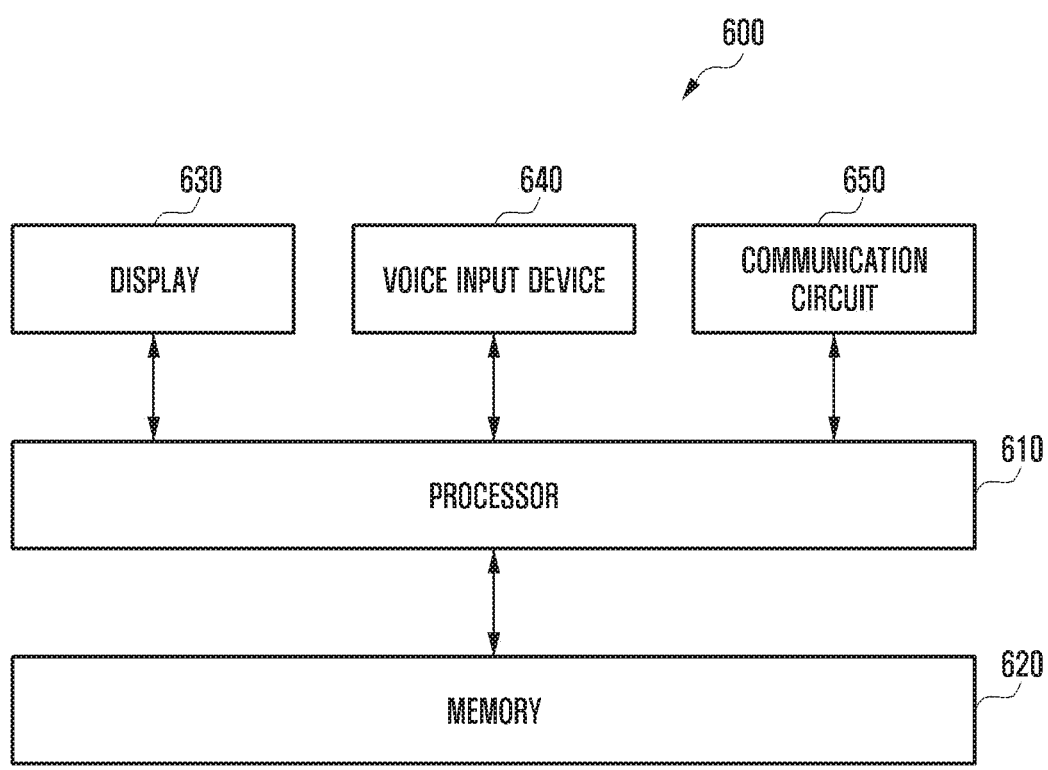
FIG. 6 is a block diagram illustrating an electronic device according to various embodiments.

FIG. 6 is a block diagram illustrating an electronic device 600 according to various embodiments.

As shown in FIG. 6, an electronic device 600 according to various embodiments may include a processor 610, a memory 620, a display 630, a voice input device 640, and a communication circuit 650. Although some of the shown components are omitted or substituted, it will not hinder implementation of various embodiments of the disclosure. Also, the electronic device 600 may include at least some of the components and/or functions of the electronic device 101 of FIG. 1 and/or the electronic device 201 of FIG. 2. In FIG. 6, technical features when the electronic device 600 operates as a first electronic device (410 of FIG. 4), i.e., an electronic device that generates and transmits message data will be described.

According to various embodiments, the display 640 may display images, and may be implemented as one of a liquid crystal display (LCD), a light-emitting diode (LED) display, an organic light-emitting diode (OLED) display, a micro electro mechanical systems (MEMS) display, and an electronic paper display, but is not limited thereto. The display 630 may include at least some of the components and/or functions of the display 160 of FIG. 1 and/or the display 260 of FIG. 2.

According to various embodiments, the communication circuit 650 may be a component for transmitting/receiving data to/from various external electronic devices (e.g., the second electronic device 420 of FIG. 4), and may include at least some of the components and/or functions of the communication interface 170 of FIG. 1 and/or the communication module 220 of FIG. 2.

According to various embodiments, the voice input device 640 may collect a user's voice and may convert the voice into voice data which is digital data. According to embodiment, the electronic device 600 may collect the user's voice from a microphone (e.g., the microphone 288 of FIG. 2) provided in a portion of a housing (not shown) or a microphone provided in an earphone that is wiredly or wirelessly connected to the electronic device 600. According to another embodiment, the voice input device 640 may be provided outside the electronic device 600. For example, the voice input device 640 may acquire voice data through a hub device (e.g., the hub device 530 of FIG. 5) wired or wirelessly connected to the electronic device 600. In this case, the electronic device 600 may receive the voice data acquired by the hub device through the communication circuit 650, or may receive second text data converted from the voice data by the hub device through the communication circuit 650.

According to various embodiments, the processor 610 may be a component that can perform computations or data processing related to control and/or communication of the respective components of the electronic device 600, and may include at least some of the components and/or functions of the processor 120 of FIG. 1 and/or the application processor 210 of FIG. 2. The processor 610 may be electrically connected to internal components of the electronic device 600, such as the display 630, the communication circuit 650, the memory 620, and the like.

The memory 620 is used to temporarily or permanently store unrestricted digital data, and may include at least one of the components of the memory 130 of FIG. 1 and/or the memory 230 of FIG. 2. The memory 620 may include a volatile memory and a non-volatile memory. The non-volatile memory may include at least one of a one-time programmable ROM (OTPROM), a programmable ROM, an erasable and programmable ROM (EPROM), an electrically erasable and programmable ROM (EEPROM), a mask ROM, a flash ROM, a flash memory (e.g., NAND flash or NOR flash), a hard drive, and a solid state drive (SSD). The volatile memory may include at least one of a dynamic RAM (DRAM), a static RAM (SRAM), and synchronous dynamic RAM (SDRAM).

[The memory 620 may store various instructions to be performed in the processor 610. Such instructions may include control commands such as arithmetic and logic operations, data movement, input/output, etc., which may be recognized by the processor 610, and may be defined on a framework stored in the memory 620. The memory 620 may also store at least some of the program modules 310 of FIG. 3.

According to various embodiments, although the processor 610 is not limited to the computation and data processing function that may be implemented within the electronic device 600, the function of generating and transmitting a text message to an external electronic device will now be described in more detail. Operations of the processor 610 to be described later may be performed by loading the instructions stored in the memory 620 described above.

The electronic device 600 may store and execute a message application capable of exchanging text data with an external electronic device. The message application may include a short message service (SMS), an instant message, an email, a social network service (SNS), and the like, and there is no limit to the type of message application.

The processor 610 may display a text input window and a keyboard on the display 630 when the message application is executed, and may generate first text data according to a touch input on the keyboard. In addition, a keyboard input mode may be switched to a voice input mode according to a predetermined touch input in the message application, and in this case, the voice input device 640 may be activated to acquire user's voice data. According to another embodiment, the processor 610 may execute the message application through a voice call function when voice registered by the user and/or registered by default is received.

The processor 610 may convert the acquired voice data into second text data, using at least one of the embodiments described through FIG. 5.

When first text data and/or second text data are generated, the processor 610 may generate message data including attribute information related to the first text data and/or the second text data and the type of an input method of the first text data and/or the second text data. According to an embodiment, the type of input method may be divided into a first attribute and a second attribute. For example, the first attribute may be allocated to first text data, that is, text data that is generated by a touch input on the keyboard, and the second attribute may be allocated to second text data, that is, text data that is converted and generated from the voice data by the speech recognition engine.

According to an embodiment, the attribute information may further include display time information related to a time during which the first text data and/or the second text data is displayed on an external electronic device. When the message data is transmitted to the external electronic device (or the second electronic device 420 of FIG. 4), the external electronic device may display text data using the message application. In this case, the external electronic device may refer to the attribute information to identify the attribute of the received text data, to display the first text data for a first time when the text data is the first text data having the first attribute, and to display the second text data for a second time when the text data is the second text data having the second attribute. For example, the external electronic device may maintain the corresponding display if there is no deletion request for the first text data (e.g., the first time is infinite), and the second text data may be automatically deleted after a predetermined amount of time (e.g., the second time) elapses.

According to an embodiment, the processor 610 may extract feature information of the voice data when the voice data is input. Here, the feature information of the voice data may include at least one of volume, tone, speed, and intonation of the voice data. The processor 610 may generate the message data by including the extracted feature information in the attribute information. As will be described later, the external electronic device may give various visual and/or auditory effects to the second text data using the feature information of the voice data.

According to an embodiment, the processor 610 may transmit the voice data together with the message data to the external electronic device. Accordingly, the external electronic device may reproduce the voice data at least partially simultaneously with or separately from the display of the message data.

According to an embodiment, the processor 610 may generate emotion information of a speaker from the voice data and may transmit the attribute information including the emotion information to the external electronic device.

According to an embodiment, the electronic device 600 may install and execute various types of message applications (e.g., text messages, e-mail application, etc.), and the processor may receive a user input from a specific application (e.g., a secretary application such as s-voice) capable of a text input and a voice input. The processor may select an application to which the message data is to be transmitted according to the type of data (e.g., text, voice, or the like) input from the user. For example, when voice data is input from a user, the processor 610 may transmit the voice data and/or second text data converted from the voice data to the message application (e.g., a messenger application) capable to transmitting the voice data. In addition, when text data is input, the processor 610 may transmit the text data to the message application (e.g., a text/e-mail application) capable of transmitting the text data.

According to an embodiment, in transmitting the second text data, the processor 610 may transmit the message data using an application selected on the basis of the type of an application installed in the counterpart electronic device that receives the second text data or the communication state (e.g., data communication state or the like) of the electronic device 600. When the message data is transmitted through a specific application, the counterpart electronic device receiving the message data may output text or voice data included in the message data using the corresponding application. When the application is not specified on header information, the text or the voice data may be output using any one application capable of processing the corresponding message data.

Figure 7:
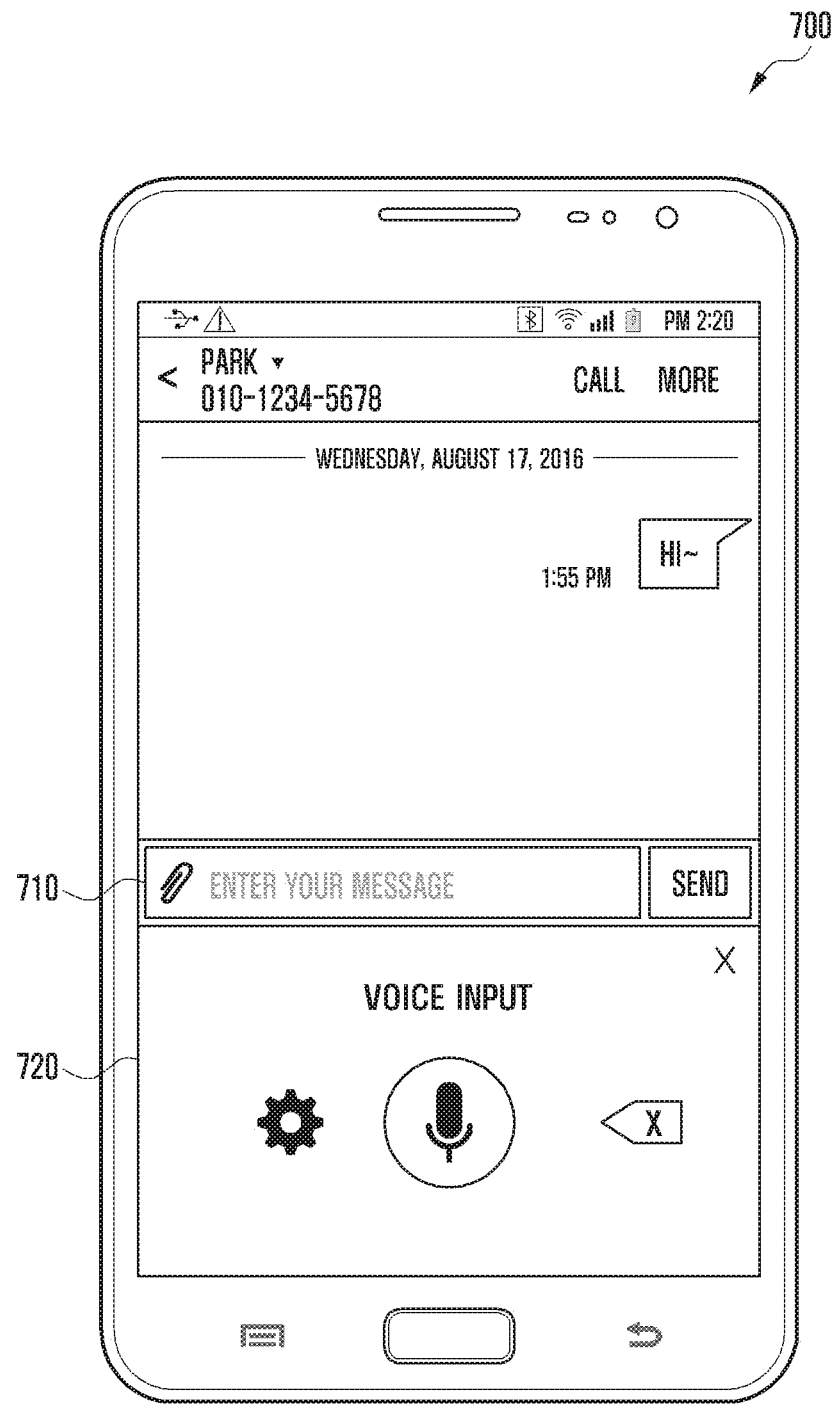
FIG. 7 illustrates an example of a message input screen of an electronic device according to various embodiments.

FIG. 7 illustrates an example of a message input screen of an electronic device according to various embodiments.

FIG. 7 illustrates an example of a screen displayed on a display (e.g., the display 610 of FIG. 6) of an electronic device 700 when a message application is executed.

As shown in FIG. 7, the message application may include a text input window 710 and/or a voice input window 720. Although not shown, a keyboard may be displayed at a lower end while the text input window 710 is displayed, and text selected according to a touch input on the keyboard may be displayed in the text input window 710.

In addition, the voice input window 720 may be displayed and a voice input device (e.g., 620 of FIG. 6) may be activated in response to an input of a predetermined icon on the message application or the generation of other events, thereby generating user's voice data. The voice data may be converted into text data and displayed in the text input window 710 by a speech recognition engine (or a hub device or a speech recognition server).

FIG. 7 is merely an example of a message application screen, and various forms are possible.

Figure 8:
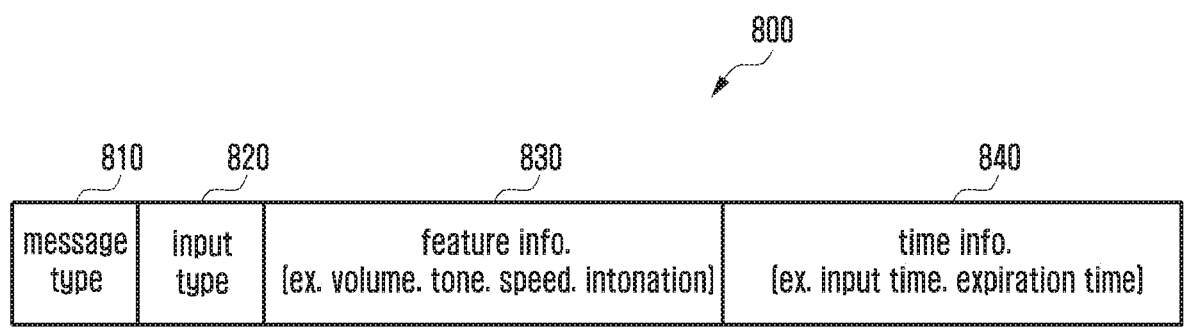
FIG. 8 illustrates an example of attribute information according to various embodiments.

FIG. 8 illustrates an example of attribute information according to various embodiments.

According to various embodiments, a processor (e.g., the processor 640 of FIG. 6) may generate attribute information related to first text data and/or second text data. The attribute information may be generated as metadata defining the attribute of the first text data and/or the second text data, and may be included in the message data together with the first text data and/or the second text data.

As shown in FIG. 8, the attribute information may include a message type 810, an input type 820, feature information 830, and time information 840, and at least some of these may be omitted.

The message type 810 may include information on the type of data included in the message data, for example, the type of text data, voice data, and the like.

The input type 820 may be divided into a first attribute or a second attribute according to a method of inputting text data. For example, the first attribute may be allocated to first text data, that is, text data that is generated by a touch input on a keyboard, and the second attribute may be allocated to second text data, that is, text data that is converted and generated from the voice data by the speech recognition engine.

The feature information 830 may include feature information 830 of voice data which is a basis of generation of the second text data when the text data is second text data having the second attribute. Therefore, the feature information 830 may be omitted when the text data is the first text data having the first attribute. The feature information 830 may include, for example, at least one of volume, tone, speed, and intonation of the voice data.

The time information 840 may include an input time and an end time of text data (or voice data). Here, the end time is information related to a time during which an external electronic device receiving the message data displays the text data, and the external electronic device may display the text data only for the end time of the attribute information and then may delete the text data.

Figure 9A:
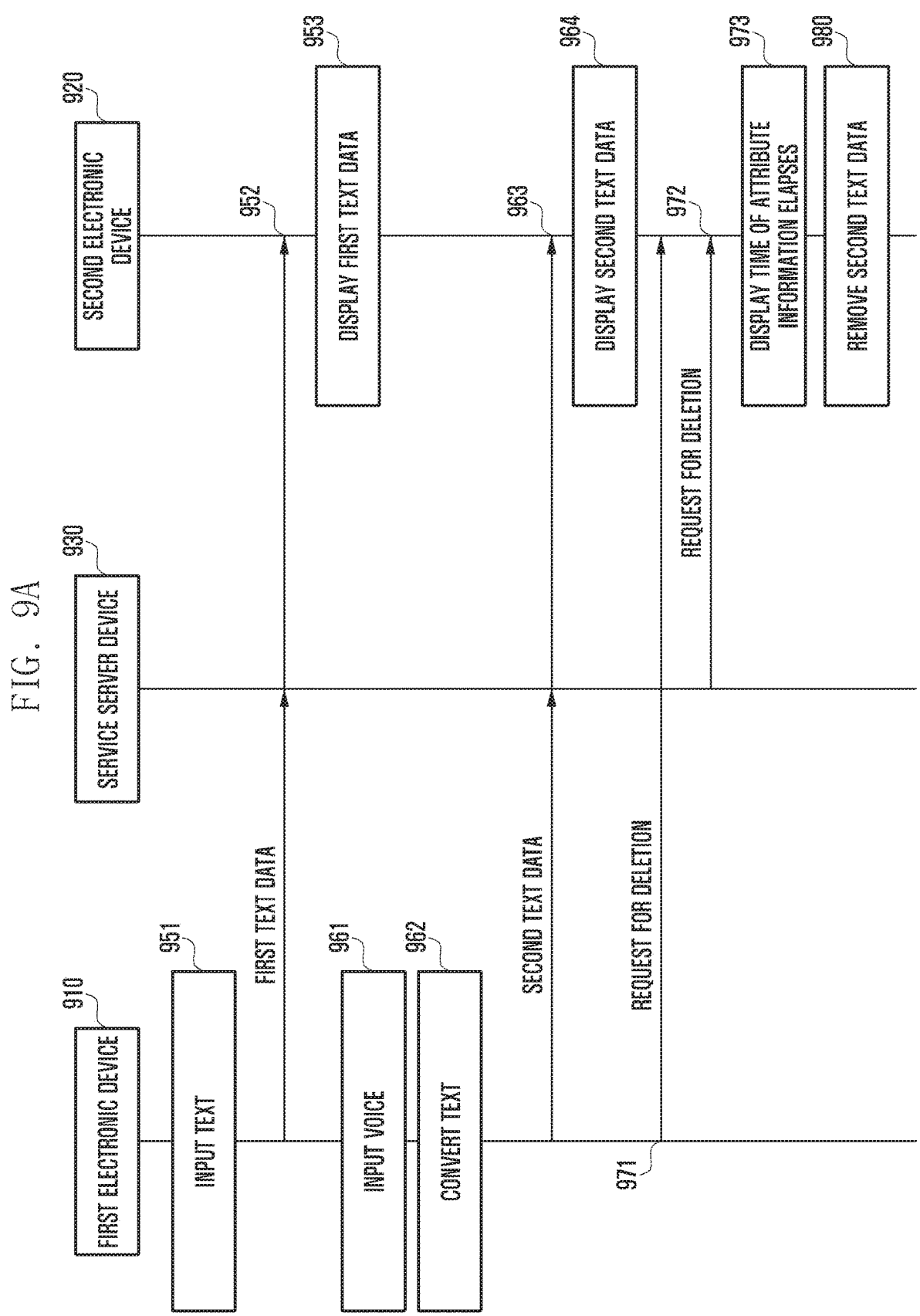
FIG. 9A illustrates an example of a message data transmission method according to various embodiments.

FIG. 9A is an example of a message data transmission method according to various embodiments.

A first electronic device 910, a second electronic device 920, and a service server device 930 shown in FIG. 9A may correspond to the first electronic device 410, the second electronic device 420, and the service sever device 430 of FIG. 4, respectively. FIG. 9A illustrates the operation of each device in time order, but various embodiments of the disclosure may not necessarily be performed in the order shown.

Operations 951 to 953 relate to operations for generating and displaying first text data based on a touch input.

In operation 951, the first electronic device 910 may execute a message application and may receive a touch input for text on a keyboard of the message application. According to an embodiment, in operation 952, the first electronic device 910 may transmit message data including first text data and attribute information of the first text data to the second electronic device 920. In this case, the message data may be transmitted to the service server device 930 through a network, and may be transmitted to the second electronic device 920 from the service server device 930.

In operation 953, the second electronic device 920 may extract the first text data from the received message data and may display the first text data on a display.

Operation 961 to 964 are operations relate to operations for generating and displaying second text data based on a voice input. In 9A, an example in which operations 961 to 964 are performed after operations 951 to 953 is shown, but the disclosure is not limited thereto. Operations 961 to 964 may be first performed, or only operations 961 to 964 may be performed. In other words, operations 951 to 953 of transmitting and displaying the first text data on the basis of the text input and operations 961 to 964 of transmitting and displaying the second text data on the basis of the voice input may be separate operations, and may be performed independently of each other depending on the input method of the user.

In operation 961, the first electronic device 910 may collect the voice of the user to generate the voice data. In operation 962, the first electronic device 910 may generate the second text data by converting the voice data to text. An embodiment of generating the second text data from the voice data has been described above with reference to FIG. 5.

According to an embodiment, in operation 963, the first electronic device 910 may transmit message data including the second text data and attribute information of the second text data to the second electronic device 920. In this case, the message data may be transmitted to the service server device 930 through a network and may be transmitted to the second electronic device 920 from the service server device 930. According to an embodiment, the attribute information of the second text data may include at least one of volume, tone, speed, and intonation of the voice data. In addition, the attribute information may further include display time information related to a time during which the second text data is displayed on the second electronic device 920.

In operation 964, the second electronic device 920 may receive the message data from the first electronic device 910 (or the service server device 930), may extract the second text data from the received message data, and may display the second text data on the display.

Operations 971 to 980 may be operations performed after the second electronic device 920 displays the second text data in operation 964.

According to various embodiments, the second electronic device 920 may display the second text data for a second time, and may delete the display of the second text data after the second time elapses. An event of triggering the deletion of the second text data may occur by at least one of operations 971, 972, and 973. That is, operations 971, 972, and 973 do not necessarily have to be performed, and even if only some of operations 971, 972, and 973 are performed, the second electronic device 920 can delete the second text data.

According to an embodiment, when a communication circuit receives deletion request information including a deletion request for the second text data while the second text data is displayed, the second electronic device 920 may remove the display of the second text data. For example, as in operation 971, the first electronic device 910 may transmit the delete request to the second electronic device 920 after the second time elapses since transmitting the message data. In addition, as in operation 972, the service server device 930 may transmit the deletion request to the second electronic device 920 after the second time elapses since transmitting the message data to the second electronic device 920. According to another embodiment, when displaying the second text data, the second electronic device 920 may transmit information related to the display time to the first electronic device 910 and/or the service server device 930, and the first electronic device 910 and/or the service server device 930 may receive the information related to the display time and may transmit the deletion request to the second electronic device 920 after the second time elapses.

According to another embodiment, the attribute information of the message data may include display time information related to the second time during which the second text data is displayed. In this case, as in operation 973, the second electronic device 920 may display the second text data, and then may remove the display of the second text data with reference to the second time of the display time information. According to an embodiment, the second electronic device 920 may remove the display of the second text data on the display and may delete the second text data stored in a memory.

According to another embodiment, when an event of triggering the deletion of the second text data occurs, such as in operations 971, 972, and 973, the second electronic device 920 may display a pop-up menu that allows the user to select whether to delete the second text data. In this case, when the user selects the deletion of the second text data through the pop-up menu, the second text data may be deleted on the displayed screen and on the memory. Unlike this, when the user selects undo deletion, the display may be maintained as is.

According to various embodiments, the second electronic device 920 displaying the message data may display the second text data generated on the basis of the voice data only for a predetermined amount of time (for example, 5 seconds or 10 seconds) and then may delete the second text data. Also, the second electronic device 920 may delete the second text data after the user of the second electronic device 920 identifies the text data, or may automatically delete the second text data after a predetermined time elapses regardless of whether the user identifies the text data.

Voice conversation has the property of disappearing immediately as long as it does not record, and according to the above-described operation, the attribute of the voice conversation can be applied to text message communication.

Figure 9B:
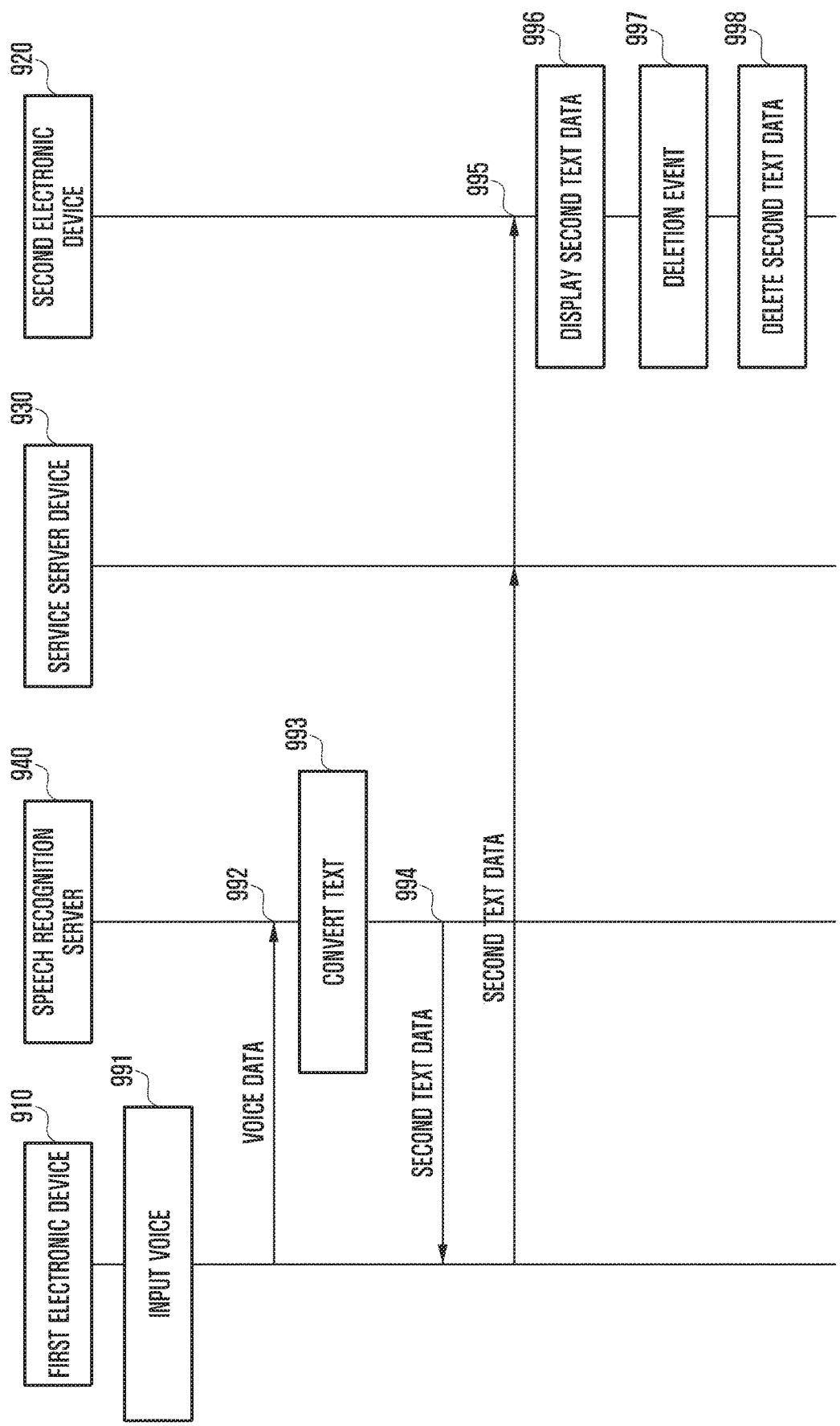
FIG. 9B illustrates a message data transmission method according to an embodiment.

FIG. 9B illustrates a message data transmission method according to an embodiment.

Hereinafter, a description of the technical features described above with reference to FIG. 9A will be omitted, and a case where a user generates message data through a voice input will be described.

In operation 991, a first electronic device 910 may collect user's voice to generate voice data. In operation 992, the first electronic device 910 may transmit the generated voice data to a speech recognition server provided with a speech recognition engine via a network.

The speech recognition server may convert the received speech recognition data into text to generate second text data in operation 993, and may transmit the generated second text data to the first electronic device 910 in operation 994.

In operation 995, the first electronic device 910 may transmit the second text data and the message data including the attribute information of the second text data to the second electronic device 920. In this case, the message data may be transmitted to the service server device 930 and may be transmitted to the second electronic device 920 from the service server device 930.

In operation 996, the second electronic device 920 may receive message data from the first electronic device 910 (or the service server device 930), may extract the second text data from the received message data, and may display the second text data on a display.

If an event (e.g., operations 971 to 973 of FIG. 9A) of triggering the deletion of the second text data occurs in operation 997, the second electronic device may delete the display of the second text data in operation 998. In this case, the second electronic device 920 may remove the display of the second text data on the display and may delete the second text data stored in the memory.

Figure 10:
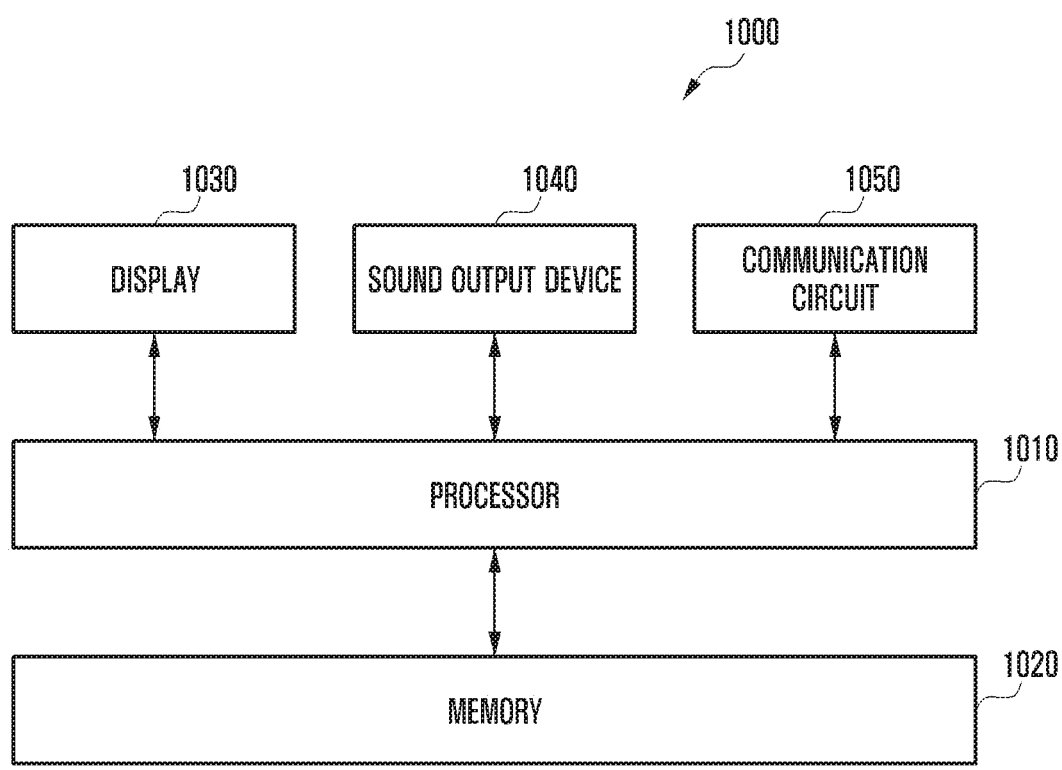
FIG. 10 is a block diagram illustrating an electronic device according to various embodiments.

FIG. 10 is a block diagram illustrating an electronic device according to various embodiments.

As shown in FIG. 10, an electronic device 1000 according to various embodiments may include a processor 1010, a memory 1020, a display 1030, a sound output device 1040, and a communication circuit 1050. Although some of the shown components are omitted or substituted, it will not hinder implementation of various embodiments of the disclosure. In FIG. 10, technical features when the electronic device 1000 operates as a second electronic device (e.g., 420 of FIG. 4), i.e., an electronic device that receives and outputs message data will be described. The description of the technical features described above with reference to FIG. 6 will be omitted below.

A communication circuit 1050 may receive message data from a first electronic device (e.g., 410 in FIG. 4) (or a service server device). The received message data may be stored in a memory 1020 and may be provided to a message application executed by a processor 1010.

A processor 1010 may acquire the message data received through the communication circuit 1050 and may identify attribute information included in the message data. As described above with reference to FIG. 8, according to an embodiment, the attribute information may be generated as metadata defining the attributes of first text data and/or second text data, and may be included in the message data together with the first text data and/or the second text data. The attribute information may include a message type, an input type, feature information, and time information, and at least some of these may be omitted.

The processor 1010 may identify the type of text data included in the message data on the basis of the identified attribute information. For example, the processor 1010 may identify whether the text data included in the message data is first text data input from a touch screen of an external electronic device or second text data converted from voice data. According to an embodiment, the attribute information may include information on the type of an input device of the text data. The attribute information may be defined as a first attribute when the text data is input from the touch screen, and may be defined as a second attribute when the text data is converted from the voice data.

When the text data included in the message data is the first text data based on the identification result of the attribute information, the processor 1010 may control the display 1030 to display the first text data for a first time. According to an embodiment, the first time may be infinite, and in this case, the first text data may be identified in the message application without being deleted unless a separate deletion event occurs.

When the text data included in the message data is the second text data based on the identification result of the attribute information, the processor 1010 may control the display 1030 to display the second text data for a second time different from the first time. According to an embodiment, the second time may be a short time (e.g., 5 seconds or 10 seconds) that is sufficient to be perceived by the user as a shorter time than the first time. The processor 1010 may display the second text data for the second time and then may remove the display of the second text data. According to an embodiment, the processor 1010 may remove the display of the second text data on the display 1030 and may delete the second text data stored in the memory 1020.

According to another embodiment, when an event of triggering the deletion of the second text data occurs, such as in operations 971, 972, and 973 with reference to FIGS. 9A and 9B, the electronic device 1000 may display a pop-up menu for allowing a user to select whether to delete the second text data in at least a portion of the display 1030. In this case, when an input for deletion is received from the user through the pop-up menu, the second text data may be deleted from the displayed screen and on the memory. Unlike this, when an input for undo deletion is received from the user, the display may be maintained as is.

According to an embodiment, when receiving deletion request information including a deletion request for the second text data through a communication circuit 1050 while the second text data is displayed, the processor 1010 may remove the display of the second text data. In this case, the deletion request information may be transmitted from an external electronic device or a service server device (e.g., 430 of FIG. 4). According to another embodiment, the attribute information may include display time information related to a first time during which the first text data is displayed and a second time during which the second text data is displayed, and the processor 1010 may identify whether the second time elapses since displaying the second text data with reference to the display time information, and may delete the display of the second text data after the second time elapses. An event in which the processor 1010 triggers the deletion of the displayed second text data has been described through various embodiments with reference to FIG. 9A and FIG. 9B.

According to various embodiments, when displaying the first text data and the second text data, the processor 1010 may display the first text data and the second text data so that the user can distinguish the input method of the text data.

According to an embodiment, when the display 1030 displays the second text data, the processor 1010 may display a visual effect different from that of displaying the first text data. Here, other visual effects may include at least one of displaying an additional icon, changing a text font, and changing the visual effect of the text input window. This will be described in more detail with reference to FIG. 12.

According to various embodiments, the attribute information of the message data may include feature information of voice data which is a basis of the second text data, and the feature information may include at least one of volume, tone, speed, and intonation of the voice data. The processor 1010 may extract the feature information from the attribute information, and when the second text data is displayed on the display 1030, the processor 1010 may reflect the feature information to display a visual effect on the display of the second text data. Here, examples of the visual effect may include determining the font of the second text data or displaying an icon corresponding to the feature information. This will be described in more detail with reference to FIG. 13.

According to various embodiments, the processor 1010 may generate sound data from the second text data in accordance with a predetermined input detection. For example, the processor 1010 may display an icon for generating sound data when displaying the second text data in the vicinity of the second text data. When generating the sound data from the second text data, the processor 1010 may determine an auditory effect of the sound data on the basis of the feature information. Here, the auditory effect may include at least one of volume, tone, speed, and intonation of the sound data.

FIGS. 11 to 14 illustrate examples of a message screen displayed on an electronic device according to various embodiments.

Figure 11:
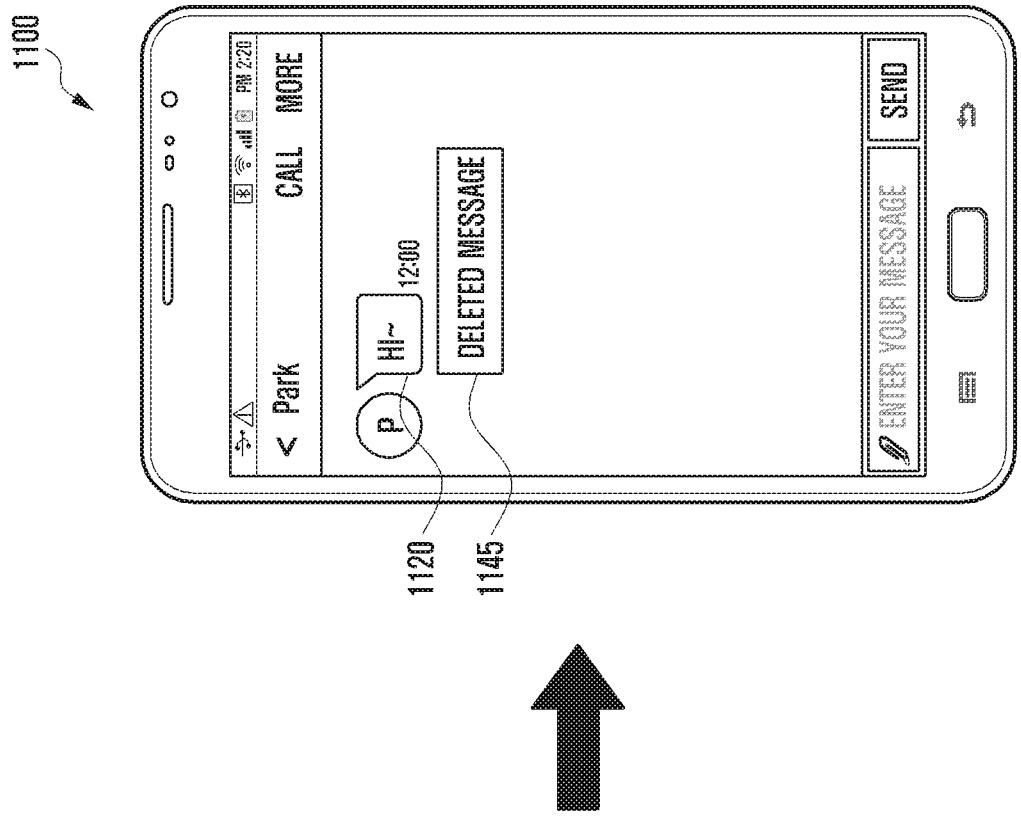
FIGS. 11 to 14 illustrate examples of a message screen displayed on an electronic device according to various embodiments.
Figure 11:
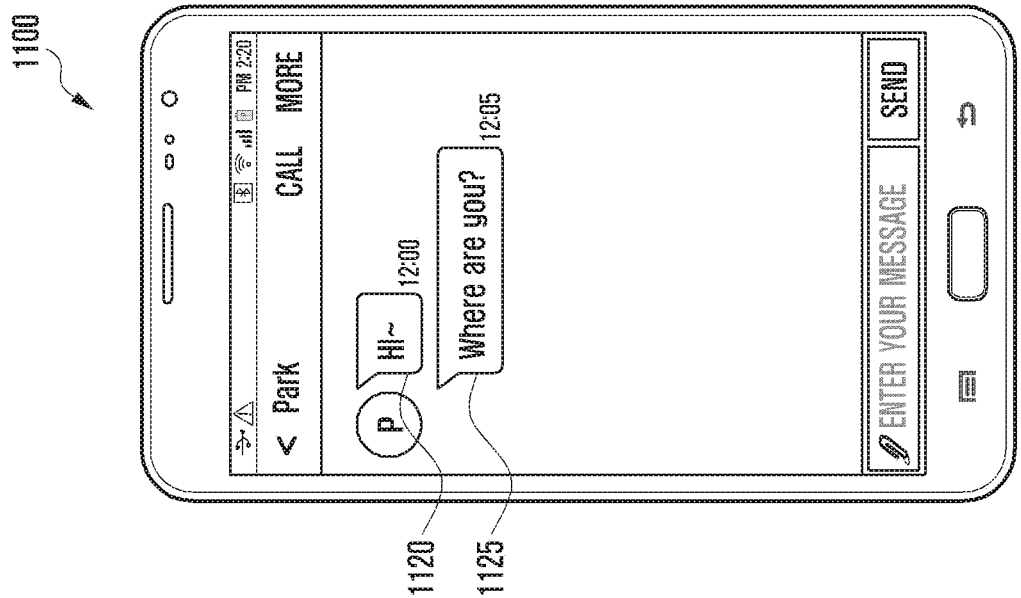

FIG. 11 illustrates an embodiment of displaying second text data in an electronic device and then automatically deleting the second text data.

When message data is received, an electronic device 1100 may display text data on a message application screen. In FIG. 11, "Hi" is first text data 1120 input through a keyboard, and "Where are you?" is second text data 1125 converted from voice data. As shown on the left, the electronic device 1100 may display the received first text data 1120 and second text data 1125, respectively.

Next, when a second time (e.g., 5 or 10 seconds) elapses, the electronic device 1100 may maintain the display of the first text data 1120 and may remove the display of the second text data 1125 as shown on the right. In this case, a separate text 1145 for notifying that the corresponding message is the deleted message may be displayed on a dialog window where the second text data has been displayed.

When a message is sent as text, the corresponding message is usually deleted only after a recipient intentionally deletes the corresponding message. However, the electronic device 1100 according to various embodiments may process a voice input message to be automatically deleted after a specific time (second time) elapses since identifying the voice input message or regardless of whether the voice input message is identified. The voice input message has the property of disappearing immediately as long as it does not record, and according to the above-described operation, the attribute of the voice conversation can be applied to text message communication.

Figure 12:
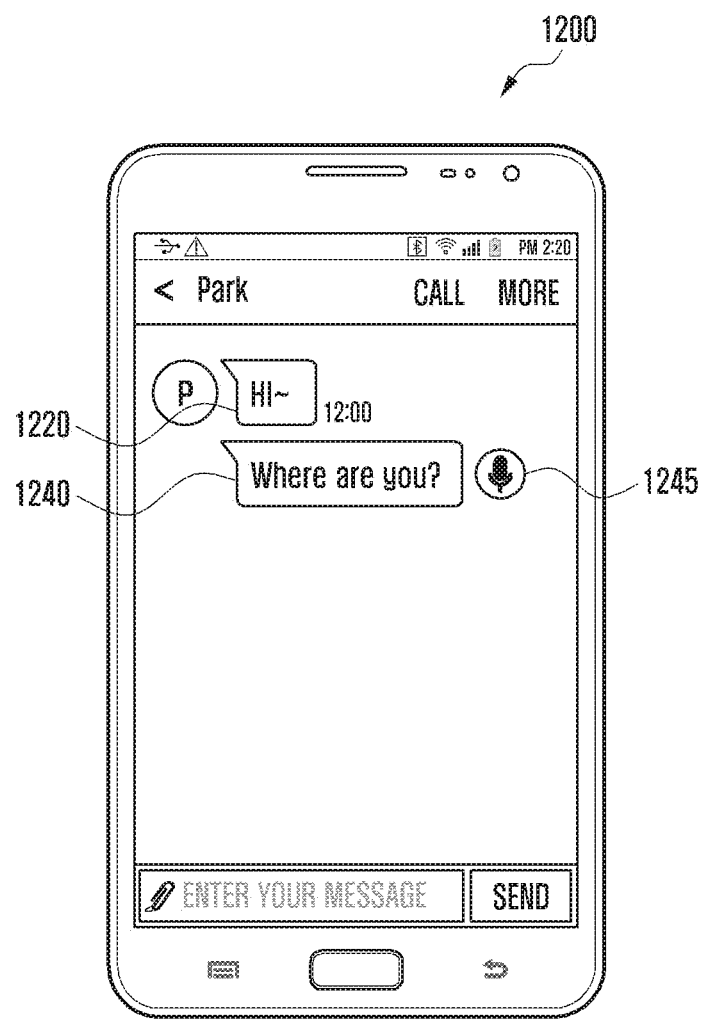

FIG. 12 illustrates an embodiment in which first text data and second text data are displayed separately from each other.

According to an embodiment, when a display displays second text data, a processor (e.g., the processor 1010 of FIG. 10) may display a visual effect different from that of displaying first text data.

For example, if an e-mail is sent to a mobile electronic device, a sort of signature like "Sent from my Galaxy" may be attached to the bottom of the e-mail. Here, for the other party, the corresponding message is a message written in the mobile electronic device, so the content of the message may be identified considering that the content thereof is simple compared to a message sent from a PC or there may be typo. However, in a case of the message application, it is not appropriate to attach such a signature because the message application relates to a method of exchanging relatively short and simple messages. Thus, according to various embodiments of the disclosure, a recipient can easily distinguish the first text data input through the keyboard and the second text data converted from the voice data, through the division of visual effects.

As shown in FIG. 12, unlike the first text data 1220 input through the keyboard, in the case of the second text data 1240 converted from the voice data, an icon 1245 for distinguishing the second text data may be displayed in the vicinity of the second text data 1240.

According to another embodiment, in the case of the second text data, a font (e.g., size, color, thickness, letter style, line spacing, caption, etc.) may be made different from that of the first text data, or the color, size, shade, or outline of a dialog window in which the second text data is displayed may be made different from that of a dialog window in which the first text data is displayed to distinguish therebetween.

In addition to the above embodiments, various methods in which the first text data and the second text data can be visually distinguished can be used.

Figure 13:
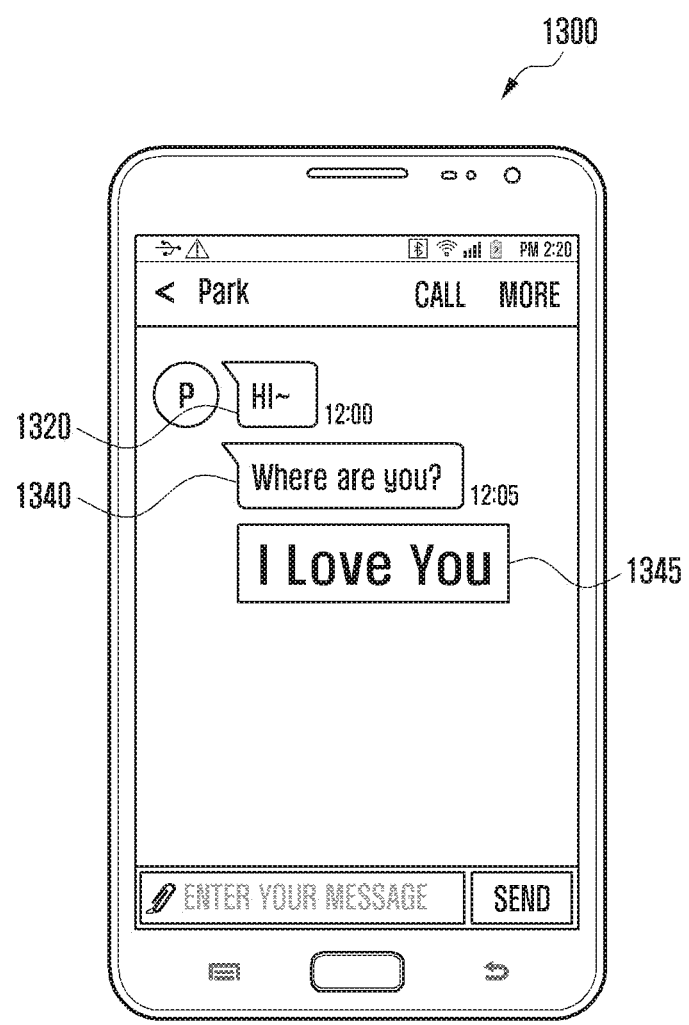

FIG. 13 illustrates an embodiment of reflecting feature information of voice data to determine a visual effect of second text data.

According to an embodiment, a processor (e.g., the processor 1010 of FIG. 10) may extract feature information from attribute information, and may reflect the feature information to display a visual effect in the display of second text data when the second data is displayed.

For example, when a user inputs a message by voice, the user can speak in a loud voice to express an emotion or a situation. In such a case, by changing the visual effect of the corresponding message displayed on the screen of the counterpart electronic device, it is possible to provide an effect of conveying one's own feelings.

As shown in FIG. 13, in the case of "I love you" having a higher volume in the second text message, the processor may control the font of "I love you" to be magnified and to be displayed on a display (e.g., the processor 1030 of FIG. 10) in 1345. According to another embodiment, when a user of an originating electronic device utters with a trembling voice, this information may be stored in the feature information, and the processor may control the corresponding text data to have a shaking or trembling effect in consideration of the feature information.

According to an embodiment, an emotional recognition technique may be used to detect user's emotions (e.g., wariness, anger, frustration, misery, boredom, tiredness, calmness, satisfaction, joy, happiness, joy, surprise, etc.) of the originating electronic device and to reflect the detected emotion in the feature information, and the processor may control an icon corresponding to the corresponding emotion to be displayed together with the second text data in consideration of the feature information.

In addition to the above-described embodiments, various visual effects that can be determined by reflecting characteristics of voice data can be used.

Figure 14:
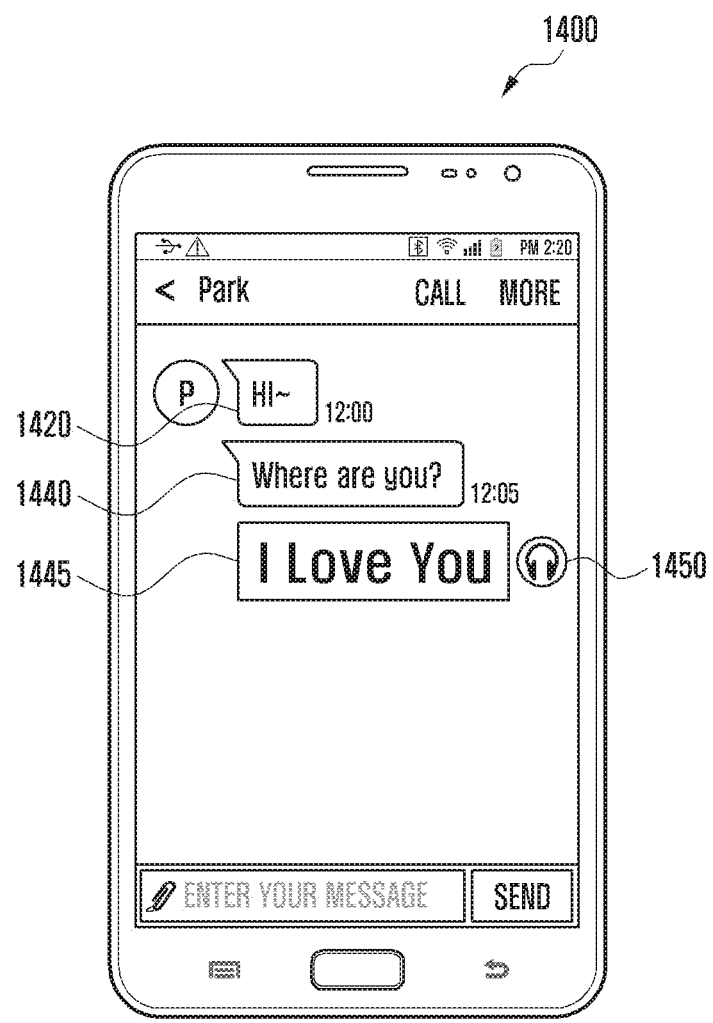

FIG. 14 illustrates an embodiment of generating and outputting second text data as sound data.

According to various embodiments, a processor (e.g., the processor 1010 of FIG. 10) may generate sound data from the second text data in response to a predetermined input detection. As shown in FIG. 14, the processor may control an icon 1450 indicating that reproduction is possible by sound to be displayed in the vicinity of second text data 1445, and in response to a touch input for the icon 1450, the processor may generate the sound data from the second text data 1445.

The processor may determine an auditory effect of the sound data on the basis of the feature information when generating the sound data from the second text data. Here, the auditory effect may include at least one of volume, tone, speed, and intonation of the sound data.

According to an embodiment, the feature information included in the attribute information of the message data may include at least one of volume, tone, speed, and intonation of the voice data. The processor may extract the feature information from the attribute information and may generate the sound data on the basis of the feature information. For example, it is possible to reflect the volume of the sound data by reflecting the volume of the voice data, or to determine the intonation of the sound data by reflecting the intonation of the voice data.

According to another embodiment, message data transmitted from a first electronic device (e.g., the electronic device 410 or the server 430 in FIG. 4) may include voice data, and the processor may cause a sound output device to output the voice data received from the first electronic device. In this case, an icon for allowing the received voice data to be output may be displayed, and the icon may be displayed to be distinguished from the icon 1450 of FIG. 14 for generating the sound data from the second text data.

An electronic device according to various embodiments of the disclosure may include a display configured to include a touch screen; a voice input device configured to collect voice to generate voice data; a communication circuit; a processor configured to be electrically connected to the display, the voice input device, and the communication circuit; and a memory configured to be electrically connected to the processor, wherein the memory may include, when executed, instructions that cause the processor to receive first text data input through the touch screen and/or the voice data input through the voice input device, and to generate message data including the first text data and/or second text data converted from the voice data and attribute information related to a type of an input method of the first text data and/or the second text data, and that causes the communication circuit to transmit the message data to an external electronic device.

According to various embodiments, the attribute information may be divided into a first attribute or a second attribute according to the type of input method of the text data included in the message data.

According to various embodiments, the processor may generate the attribute information including display time information related to a time during which the first text data and/or the second text data is displayed on the external electronic device, in accordance with the type of input method.

According to various embodiments, the processor may acquire feature information of the voice data including at least one of volume, tone, speed, and intonation of the voice data, and may generate the attribute information including the extracted feature information.

According to various embodiments, the processor may transmit the voice data to an external speech recognition server through the communication circuit, and may acquire the second text data received from the speech recognition server and the feature information.

An electronic device according to various embodiments may include a display; a communication circuit; a processor configured to be electrically connected to the display and the communication circuit; and a memory configured to be electrically connected to the processor, wherein the memory may include, when executed, instructions that cause the processor to acquire message data received through the communication circuit and to identify attribute information included in the message data, and that cause the display to display, when text data included in the message data is first text data input from a touch screen of an external electronic device on the basis of the identification result, the first text data for a first time and to display, when the text data included in the message data is second text data converted from voice data, the second text data for a second time different from the first time.

According to various embodiments, the processor may display the second text data for the second time, and then may remove the display of the second text data.

According to various embodiments, when the communication circuit receives deletion request information including a deletion request for the second text data while the second text data is displayed, the processor may remove the display of the second text data.

According to various embodiments, the attribute information may include display time information related to the first time for displaying the first text data and a second time for displaying the second text data.

According to various embodiments, when the display displays the second text data, the processor may display a visual effect different from that of displaying the first text data.

According to various embodiments, the different visual effect may include at least one of displaying an additional icon, changing a text font, and changing a visual effect of a text input window.

According to various embodiments, the attribute information of the message data may include feature information including at least one of volume, tone, speed, and intonation of the voice data which is a basis of the second text data, and the processor may extract the feature information from the attribute information and may display a visual effect in the display of the second text data by reflecting the feature information when displaying the second text data.

According to various embodiments, the processor may reflect the feature information to determine the font of the second text data and/or to display an icon corresponding to the feature information.

According to various embodiments, the processor may generate sound data from the second text data in response to a predetermined input detection, and may determine an auditory effect of the sound data on the basis of the feature information.

According to various embodiments, the auditory effect may include at least one of volume, tone, speed, and intonation of the sound data.

Figure 15:
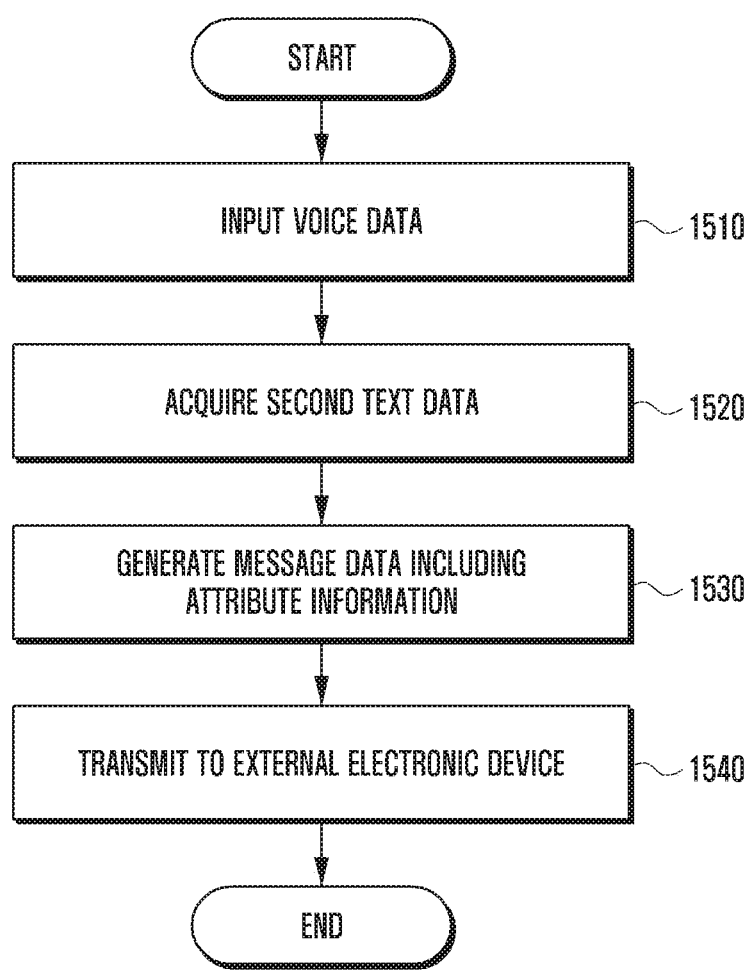
FIG. 15 is a flowchart illustrating a message generation method of an originating electronic device according to various embodiments.

FIG. 15 is a flowchart illustrating a message generation method of an originating electronic device according to various embodiments.

The illustrated method can be performed by the electronic device 600 (or the first electronic device) described above with reference to FIG. 6, and the description of the technical features described above will be omitted below.

In operation 1510, the electronic device may receive an input of voice data from a voice input device (e.g., 640 of FIG. 6).

In operation 1520, a processor (e.g., 610 of FIG. 6) of the electronic device may acquire second text data from the voice data. Various embodiments of acquiring the second text data from the voice data have been described with reference to FIG. 5.

In operation 1530, the processor may generate message data including attribute information. Here, the attribute information may include at least some of a message type, an input type, feature information, and time information as descried with reference to FIG. 8. The attribute information may be generated as metadata defining the attribute of the second text data and may be included in the message data together with the second text data.

In operation 1540, the processor may transmit the message data to an external electronic device (e.g., the second electronic device 420 or the server device 430 in FIG. 4) through the communication circuit.

FIG. 16 is a flowchart illustrating a message output method of a receiving electronic device according to various embodiments.

The illustrated method can be performed by the electronic device 1000 (or the second electronic device) described above with reference to FIG. 10, and the description of the technical features described above will be omitted below.

In operation 1610, the electronic device may receive message data from an external electronic device (e.g., the first electronic device 410 or the server device 430 in FIG. 4) via a communication circuit (e.g., 1030 of FIG. 10).

In operation 1620, the processor of the electronic device (e.g., 1010 in FIG. 10) may identify attribute information included in the received message data. The processor may identify the type of text data included in the message data on the basis of the identified attribute information. For example, the processor may determine whether the text data included in the message data is first text data input from a touch screen of the external electronic device or second text data converted from voice data. According to an embodiment, the attribute information may include information on the type of input method of the text data, and may be defined as a first attribute when the text data is input from the touch screen and as a second attribute when the text data is converted from the voice data.

In operation 1630, the processor may determine whether the text data is the first text data, and in operation 1640, the processor may display the first text data for a first time. According to an embodiment, the first time may be infinite, and in this case, the first text data may be maintained on a message application or a memory (e.g., the memory 1020 of FIG. 10) without being deleted unless a separate deletion event occurs.

In operation 1650, the processor may determine whether the text data is the second text data, and the processor may display the second text data for a second time in operation 1660 and then may delete the display of the second text data in operation 1670.

According to an embodiment, the second time may be a short time (e.g., 5 seconds or 10 seconds) that is sufficient to be perceived by the user as a shorter time than the first time.

According to an embodiment, when receiving deletion request information including a deletion request for the second text data from the external electronic device through the communication circuit while the second text data is displayed, the processor may remove the display of the second text data. According to another embodiment, the attribute information may include display time information related to a first time during which the first text data is displayed and a second time during which the second text data is displayed, and the processor may identify whether the second time elapses since displaying the second text data with reference to the display time information, and may delete the display of the second text data after the second time elapses.

According to an embodiment, when the number of times the second text data is displayed is equal to or more than a predetermined number (e.g., three times), the processor may perform deletion of the second text data. For example, the attribute information included in the message data may include the number of browsable times.

A message data output method of an electronic device according to various embodiments of the disclosure may include: receiving message data generated by an external electronic device; identifying attribute information included in the message data; displaying, when text data included in the message data is first text data input from a touch screen of the external electronic device on the basis of the identification result, the first text data for a first time; and displaying, when the text data included in the message data is second text data converted from voice data, the second text data for a second time different from the first time.

According to various embodiments, the message data output method may further include displaying the second text data for the second time and then removing the display of the second text data.

According to various embodiments, the displaying of the second text data may include displaying a visual effect different from that of displaying the first text data.

According to various embodiments, the attribute information of the message data may include feature information including at least one of volume, tone, speed, and intonation of the voice data which is a basis of the second text data, and the displaying of the second text data may include extracting the feature information from the attribute information, and displaying a visual effect in the display of the second text data by reflecting the feature information.

According to various embodiments, the message data output method may further include generating and outputting sound data from the second text data in response to a predetermined input detection, wherein the generating and outputting of the sound data may include determining an auditory effect of the sound data on the basis of the feature information.

The invention claimed is:

1. An electronic device comprising:
a display including a touch screen;
a voice input device configured to collect voice and generate voice data;
a communication circuit;
a processor electrically connected to the display, the voice input device, and the communication circuit; and
a memory storing instructions which, when executed by the processor, cause the electronic device to:

receive first text data input through the touch screen and/or the voice data input through the voice input device, generate message data including the first text data and/or second text data converted from the voice data and attribute information related to a type of an input method of the first text data and/or the second text data, and cause the communication circuit to transmit the message data to an external electronic device, wherein the attribute information further includes display time information related to a time during which the first text data and/or the second text data is displayed on the external electronic device, in accordance with the type of the input method such that a time of displaying, by the external electronic device, the first text data is different from a time of displaying, by the external electronic device, the second text data.

2. The electronic device as claimed in claim 1, wherein the attribute information is divided into a first attribute or a second attribute according to the type of input method of the text data included in the message data.

3. The electronic device as claimed in claim 1, wherein the instructions cause the processor to acquire feature information of the voice data including at least one of volume, tone, speed, and intonation of the voice data, and to generate the attribute information including the extracted feature information.

4. The electronic device as claimed in claim 3, wherein the instructions cause the processor to transmit the voice data to an external speech recognition server through the communication circuit, and to acquire the second text data received from the speech recognition server and the feature information.

5. An electronic device comprising:
a display;
a communication circuit;
a processor electrically connected to the display and the communication circuit; and
a memory storing instructions which, when executed by the processor, cause the electronic device to:
acquire message data received through the communication circuit,
identify attribute information included in the received message data,
when text data included in the message data is first text data input from a touch screen of an external electronic device on a basis of the identification result, determine display time of the first text data being a first time and cause the display to display the first text data for the first time, and
when the text data included in the message data is second text data converted from voice data, determine display time of the second text data being a second time different from the first time and cause the display to display the second text data for the second time and remove the display of the second text data after the second time.

6. The electronic device as claimed in claim 5, wherein, when the communication circuit receives deletion request information including a deletion request for the second text data while the second text data is displayed, the instructions cause the processor to remove the display of the second text data.

7. The electronic device as claimed in claim 5, wherein the attribute information includes display time information related to the first time for displaying the first text data and a second time for displaying the second text data.

8. The electronic device as claimed in claim 5, wherein, when the display displays the second text data, the instructions cause the processor to display a visual effect different from that of displaying the first text data.

9. The electronic device as claimed in claim 8, wherein the different visual effect includes at least one of displaying an additional icon, changing a text font, and changing a visual effect of a text input window.

10. The electronic device as claimed in claim 5, wherein
the attribute information of the message data includes feature information including at least one of volume, tone, speed, and intonation of the voice data which is a basis of the second text data, and
the instructions cause the processor to extract the feature information from the attribute information and to display a visual effect in the display of the second text data by reflecting the feature information when displaying the second text data.

11. The electronic device as claimed in claim 10, wherein the instructions cause the processor to reflect the feature information to determine a font of the second text data and/or to display an icon corresponding to the feature information.

12. The electronic device as claimed in claim 10, wherein the instructions cause the processor to generate sound data from the second text data in response to a predetermined input detection, and to determine an auditory effect of the sound data on the basis of the feature information.

13. The electronic device as claimed in claim 12, wherein the auditory effect includes at least one of volume, tone, speed, and intonation of the sound data.

14. A message data output method of an electronic device, comprising:
receiving message data generated by an external electronic device;
identifying attribute information included in the message data;
when text data included in the message data is first text data input from a touch screen of the external electronic device on a basis of the identification result, determining display time of the first text data being a first time and displaying the first text data for the first time; and
when the text data included in the message data is second text data converted from voice data, determining display time of the second text data for a second time different from the first time, displaying the second text data for the second time and removing the display of the second text data after the second time.

15. The message data output method as claimed in claim 14, wherein the displaying of the second text data includes displaying a visual effect different from that of displaying the first text data.

16. The message data output method as claimed in claim 14, wherein
the attribute information of the message data includes feature information including at least one of volume, tone, speed, and intonation of the voice data which is a basis of the second text data, and
the displaying of the second text data comprises extracting the feature information from the attribute information, and displaying a visual effect in the display of the second text data by reflecting the feature information.

17. The message data output method as claimed in claim 14, further comprising:

generating and outputting sound data from the second text data in response to a predetermined input detection,
wherein the generating and outputting of the sound data comprises determining an auditory effect of the sound data on a basis of feature information.

* * * * *